United States Patent
Sachs et al.

(10) Patent No.: US 11,491,716 B2
(45) Date of Patent: Nov. 8, 2022

(54) MANAGING POWDER MOBILITY IN BINDER JETTING FOR ADDITIVE MANUFACTURING

(71) Applicant: Desktop Metal, Inc., Burlington, MA (US)

(72) Inventors: Emanuel Michael Sachs, Newton, MA (US); George Hudelson, Billerica, MA (US); Paul A. Hoisington, Hanover, NH (US); Christopher Benjamin Renner, Cambridge, MA (US); Keith Roy Vaillancourt, Hudson, NH (US); Edward Russell Moynihan, Plainfield, NH (US)

(73) Assignee: Desktop Metal, Inc., Burlington, MA (US)

( * ) Notice: Subject to any disclaimer, the term of this patent is extended or adjusted under 35 U.S.C. 154(b) by 0 days.

(21) Appl. No.: 17/163,721

(22) Filed: Feb. 1, 2021

(65) Prior Publication Data
US 2021/0154926 A1 May 27, 2021

Related U.S. Application Data

(63) Continuation of application No. 16/576,465, filed on Sep. 19, 2019, now Pat. No. 10,933,582, which is a
(Continued)

(51) Int. Cl.
  *B29C 64/165* (2017.01)
  *B33Y 10/00* (2015.01)
  (Continued)

(52) U.S. Cl.
  CPC .......... *B29C 64/165* (2017.08); *B22F 1/148* (2022.01); *B22F 10/00* (2021.01); *B22F 12/00* (2021.01);
  (Continued)

(58) Field of Classification Search
  CPC ... B29C 64/165; B29C 64/188; B29C 64/321; B29C 64/364; B29C 64/393;
  (Continued)

(56) References Cited

U.S. PATENT DOCUMENTS

| | | | |
|---|---|---|---|
| 10,486,363 B2* | 11/2019 | Sachs | B22F 1/0096 |
| 10,933,582 B2* | 3/2021 | Sachs | B28B 1/001 |
| 2021/0268727 A1* | 9/2021 | Ge | B29C 64/307 |

OTHER PUBLICATIONS

Tailin Fan, Droplet-Powder Impact Interaction in Three Dimensional Printing, Sep. 1995, Massachusetts Institute of Technology.

* cited by examiner

*Primary Examiner* — Mary Lynn F Theisen
(74) *Attorney, Agent, or Firm* — Jonathan D. Hall

(57) ABSTRACT

Devices, systems, and methods are directed to the use of vapor phase change in binder jetting processes for forming three-dimensional objects. In general, a vapor of a first fluid may be directed to a layer of a powder spread across a build volume. The vapor may condense to reduce mobility of the particles of the powder of the layer. For example, the condensing vapor may reduce the likelihood of particle ejection from the layer and, thus, may reduce the likelihood of clogging or otherwise degrading a printhead used to jet a second fluid (e.g., a binder) to the layer. Further, or instead, the condensing vapor may increase the density of the powder in the layer which, when repeated over a plurality of layers forming a three-dimensional object, may reduce the likelihood of slumping of the part during sintering.

6 Claims, 12 Drawing Sheets

Related U.S. Application Data continuation of application No. 16/243,966, filed on Jan. 9, 2019, now Pat. No. 10,486,363.

(60) Provisional application No. 62/615,091, filed on Jan. 9, 2018.

(51) Int. Cl.
*B29C 64/364* (2017.01)
*B29C 64/371* (2017.01)
*B29C 64/393* (2017.01)
*B33Y 50/02* (2015.01)
*B29C 64/209* (2017.01)
*B33Y 30/00* (2015.01)
*B29C 64/30* (2017.01)
*B29C 64/20* (2017.01)
*B28B 1/00* (2006.01)
*B22F 12/00* (2021.01)
*B22F 10/00* (2021.01)
*B22F 1/148* (2022.01)
*B22F 10/10* (2021.01)

(52) U.S. Cl.
CPC .............. *B28B 1/001* (2013.01); *B29C 64/20* (2017.08); *B29C 64/209* (2017.08); *B29C 64/30* (2017.08); *B29C 64/364* (2017.08); *B29C 64/371* (2017.08); *B29C 64/393* (2017.08); *B33Y 10/00* (2014.12); *B33Y 30/00* (2014.12); *B33Y 50/02* (2014.12); *B22F 10/10* (2021.01); *B22F 2999/00* (2013.01)

(58) Field of Classification Search
CPC . B29C 64/20–379; B28B 1/001; B33Y 10/00; B33Y 30/00; B33Y 50/02
See application file for complete search history.

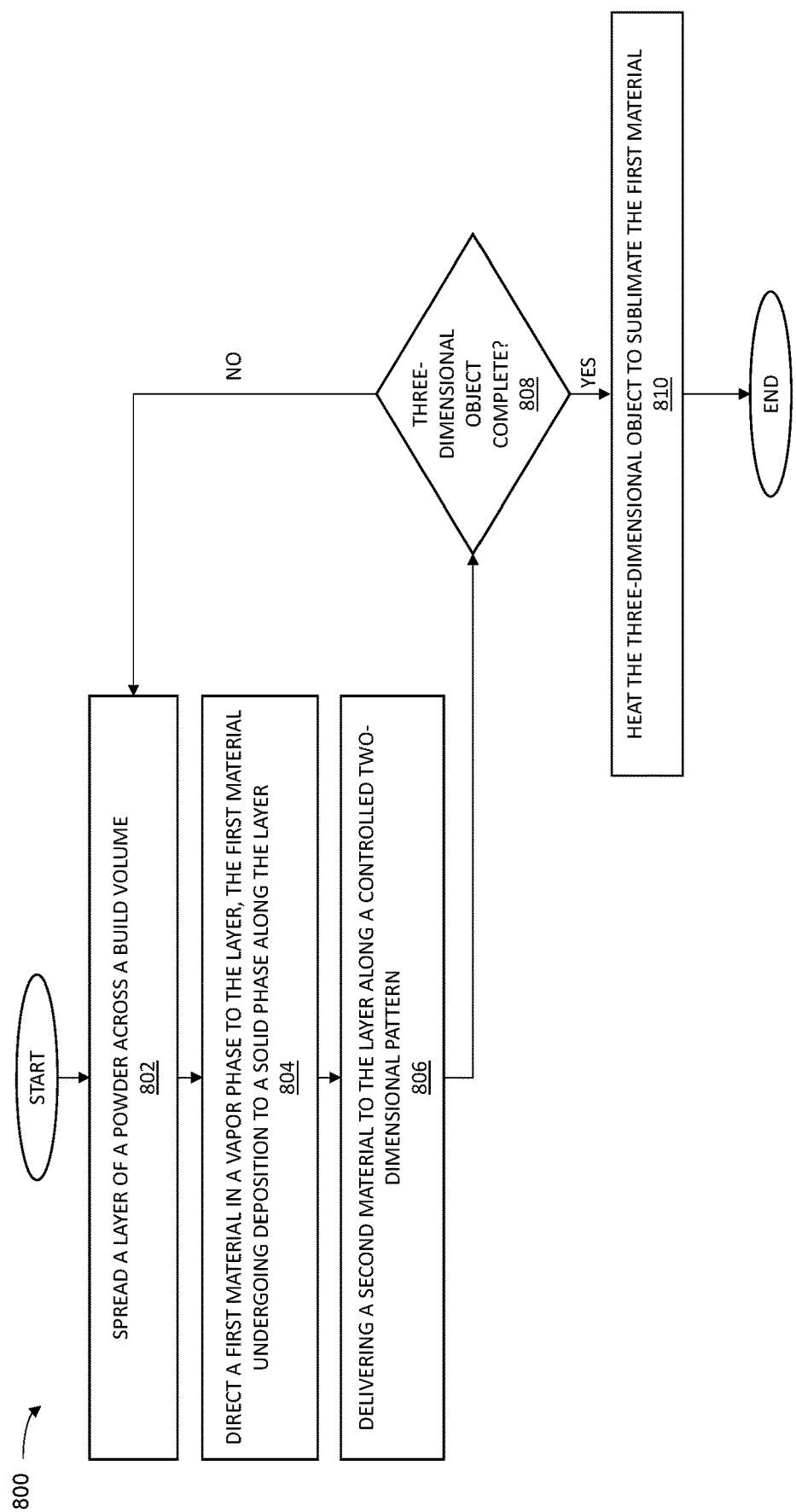

MANAGING POWDER MOBILITY IN BINDER JETTING FOR ADDITIVE MANUFACTURING

CROSS-REFERENCE TO RELATED APPLICATIONS

This application claims the benefit of U.S. Provisional Application No. 62/615,091, filed on Jan. 9, 2018, the entire contents of which are hereby incorporated herein by reference.

BACKGROUND

Binder jetting is an additive manufacturing technique based on the use of a binder to join particles of a powder to form a three-dimensional object. In particular, the binder is jetted from a printhead onto successive layers of the powder in a build volume, where layers of the powder and the binder adhere to one another to form a three-dimensional object. Through subsequent processing, such as removal of the binder from the three-dimensional object, the three-dimensional object can be formed into a finished part.

In general, however, the quality of the finished part may be impacted by unintended movement of the powder during layer-by-layer formation of the three-dimensional object or by subsequent processing of the three-dimensional object to form the finished part. For example, as the binder is jetted from the printhead into the build volume, the impact of droplets of the binder on the particles of the powder in the build volume may cause ejection of powder particles from the build volume. The ejected particles, and some small amounts of binder carried with the ejected particles, can redeposit on the printhead, clogging orifices or otherwise degrading the printhead, including by changing the wetting conditions on the outlet of the printhead. Such degradation of the printhead may compromise accuracy of placement of the binder along the powder in the build volume, thus producing defects in the three-dimensional object, and ultimately in the finished part, formed from the three-dimensional object.

Accordingly, there remains a need for managing powder mobility during binder jetting processes for additive manufacturing of three-dimensional parts.

SUMMARY

Devices, systems, and methods are directed to the use of vapor phase change in binder jetting processes for forming three-dimensional objects. In general, a vapor of a first fluid may be directed to a layer of a powder spread across a build volume. The vapor may condense to reduce mobility of the particles of the powder of the layer. For example, the condensing vapor may reduce the likelihood of particle ejection from the layer and, thus, may reduce the likelihood of clogging or otherwise degrading a printhead used to jet a second fluid (e.g., a binder) to the layer. Further, or instead, the condensing vapor may increase the density of the powder in the layer which, when repeated over a plurality of layers forming a three-dimensional object, may reduce the likelihood of slumping of the part during sintering.

According to one aspect, a method for managing powder mobility in binder jet additive manufacturing may include spreading a layer of a powder across a build volume, the powder having a mobility for particles of the powder as the layer of the powder is spread across the build volume, directing a first fluid in a vapor phase toward the layer, condensing the first fluid from the vapor phase to a liquid phase to reduce the mobility of the particles of the powder, delivering a second fluid along the layer in a controlled two-dimensional pattern associated with a portion of a three-dimensional object to be formed within the layer, and for each layer of a plurality of layers, repeating the steps of spreading a respective layer of the powder, directing the first fluid in the vapor phase toward the respective layer, condensing the first fluid from the vapor phase to the liquid phase to reduce mobility of the particles of the powder along the respective layer, and delivering the second fluid along the respective layer, wherein at least the second fluid operates to bind at least some of the powder in the plurality of layers to define a three-dimensional object in the build volume.

In certain implementations, for each layer, condensing the first fluid from the vapor phase to the liquid phase may precede delivering the second fluid to the respective layer.

In some implementations, at least a portion of each layer of the powder may be at a temperature less than a dew point of the first fluid in a gaseous environment above the respective layer.

In certain implementations, the first fluid includes one or more of water, acetone, toluene, methyl ethyl ketone, ethanol, isopropyl alcohol, and n-butyl acetate.

In some implementations, directing the first fluid in the vapor phase to each layer of the powder may include issuing the first fluid in the vapor phase from an outlet section defined by an evaporator over the respective layer.

In certain implementations, the method may further include moving the evaporator and respective layer relative to one another as the first fluid in the vapor phase issues from the outlet section toward the given layer.

In some implementations, directing the first fluid in the vapor phase to each layer of the powder may include delivering the first fluid in the vapor phase along a span of at least one dimension of the respective layer.

In some implementations, a void space may be defined between particles of the powder in the plurality of layers and the first fluid in the liquid phase fills greater than about 0.1 percent of the void space and less than about 10 percent of the void space.

In certain implementations, the first fluid in the vapor phase may be at a temperature less than a boiling point of the first fluid.

In some implementations, the first fluid in the vapor phase may be at a temperature greater than or equal to a boiling point of the first fluid.

In certain implementations, directing the first fluid in the vapor phase to each layer of the powder may include forming a mixture of the vapor phase of the first fluid with a carrier gas, the carrier gas different from the vapor phase of the first fluid, and delivering the mixture toward the respective layer. For example, forming the mixture of the vapor phase of the first fluid with the carrier gas includes sparging the carrier gas through the first fluid. Additionally, or alternatively, the carrier gas may include one or more of nitrogen, argon, or air.

In some implementations, directing the first fluid in the vapor phase to each layer of the powder may include forming liquid droplets of the first fluid and vaporizing the liquid droplets of the first fluid to form the first fluid in the vapor phase. For example, forming the liquid droplets of the first fluid may include atomizing a liquid phase of the first fluid. Atomizing the liquid phase of the first fluid may include, for example, one or more of ultrasonic atomization, hydraulic atomization, or gas atomization. Additionally, or alternatively, the liquid droplets have an average size of greater than about 5 microns and less than about 100 microns. Further, or instead, directing the first fluid in the vapor phase to each layer of the powder may further include dispersing the liquid droplets in a distribution gas, and vaporizing the liquid droplets of the first fluid in the distribution gas to form a mixture of the first fluid in the vapor phase and the distribution gas.

In some implementations, a saturation temperature of the vapor phase of the first fluid in the mixture with the carrier gas may be greater than about 50° C. and less than about 100° C.

In certain implementations, directing the vapor phase of the first fluid toward each layer may include forming the vapor phase of the first fluid in an evaporator moving over the build volume as each layer is spread across the build volume and, between spreading successive layers of the plurality of layers, interrupting a flow of the vapor phase of the first fluid from the evaporator.

In some implementations, the second fluid may be delivered along each layer of the powder from a printhead trailing movement of the evaporator over the build volume as the vapor phase of the first fluid is directed toward the respective layer.

In certain implementations, wherein the powder may include one or more of metallic particles (e.g., metallic particles that are alloyable with one another), ceramic particles, polymeric particles, or combinations thereof. Additionally, or alternatively, at least a portion of the powder may be non-oxidizing with respect to the first fluid.

In some implementations, the second fluid may include at least one component of a binder system. In some instances, the second fluid may further include a liquid medium, and the at least one component of the binder system is dispersed in the liquid medium. For example, the liquid medium may include a solvent of the at least one component of the binder system, and the at least one component of the binder system is dissolved in the solvent.

In certain implementations, directing the first fluid in the vapor phase to at least some of the layers in the plurality of layers increases a volumetric concentration of the vapor phase of the first fluid in a gaseous environment immediately above the respective layer of the powder.

In some implementations, the first fluid in the liquid phase and the second fluid may be mutually soluble with one another along each layer.

In certain implementations, the first fluid in the liquid phase and the second fluid may be mutually insoluble with one another along each layer.

In some implementations, at least one component of the first fluid in the liquid phase may be the same as at least one component of the second fluid.

In certain implementations, the method may include comprising delivering an anti-sintering agent to one or more layers of the plurality of layers as the three-dimensional object is formed. For example, the anti-sintering agent and the first fluid in the liquid phase may be mutually soluble with one another. Additionally, or alternatively, the anti-sintering agent may at least partially overlap the second fluid in one or more layers of the plurality of layers as the three-dimensional object is formed.

In some implementations, delivering the second fluid along the layer along the controlled two-dimensional pattern may include jetting the second fluid from a printhead moving over the layer.

In certain implementations, the method may further include, for at least some of the layers of the plurality of layers, freezing the liquid phase of the first fluid to form a solid phase along the respective layer of the powder to hold particles of the powder together as the second fluid is delivered to the respective layer. For example, freezing the liquid phase of the first fluid along the layer of the powder may include directing one or more of refrigerated air or liquid nitrogen onto the first fluid in the liquid phase along the layer of the powder. Additionally, or alternatively, the second fluid delivered to at least some of the plurality of layers may melt the solid phase to the liquid phase along at least the respective controlled two-dimensional pattern associated with the respective layer.

According to another aspect, a system for controlling powder mobility in binder jet additive manufacturing may include a print box defining at least a portion of a build volume, a spreader above the print box, the spreader and the print box movable relative to one another to spread a layer of a powder along the build volume, a printhead defining at least one ejection orifice directed toward the print box, and an evaporator including a housing and a heater, the housing defining an inlet section, an outlet section, and a flow path extending therebetween, and the heater in thermal communication with the flow path, wherein the spreader, the outlet section, the at least one ejection orifice, and the print box are movable in coordination with one another such that a vapor heated along the flow path by the heater is issuable from the outlet section of the evaporator to the layer of the powder in advance of a liquid delivered from the at least one ejection orifice of the printhead to the layer of the powder.

In certain implementations, the inlet section may have a first open area, the outlet section has a second open area, and a ratio of the second open area to the first open area is greater than about 10:1 and less than about 5,000:1.

In some implementations, the print box may be stationary and the spreader, the printhead, and the outlet section of the evaporator are movable in coordination with one another over the print box.

In certain implementations, at least a portion of the flow path between the inlet section and the outlet section is nonlinear.

In some implementations, the evaporator may further include an atomizer disposed along the inlet section and in fluid communication with the outlet section via the flow path. For example, the atomizer may be one or more of an ultrasonic atomizer, a hydraulic atomizer, or a gas atomizer. Additionally, or alternatively, the atomizer may further include a gate selectively movable relative to the flow path to control fluid flow through the outlet section.

In certain implementations, the evaporator may further include a humidity probe positioned to measure humidity of a fluid issuing from the outlet section of the evaporator.

In some implementations, the outlet section may include a slit spanning at least one dimension of the build volume as the outlet section is over the print box.

In certain implementations, the system may further include a controller in electrical communication with the spreader, the printhead, and the evaporator, the controller including one or more processors and a non-transitory, computer-readable storage medium having stored thereon computer executable instructions for causing one or more processors to move the spreader and the print box relative to one another to spread a layer of a powder across the build volume, direct a vapor phase of a first fluid from the outlet section of the evaporator to the layer of the powder along the build volume, deliver a second fluid from the ejection orifice to the layer along a controlled two-dimensional pattern associated with the layer, and for each layer of a plurality of layers, repeat the steps of moving the spreader, directing the first fluid to the layer, and delivering the second fluid to the layer, wherein at least the second fluid operates to bind at least some of the powder in the plurality of layers to define a three-dimensional object in the build volume.

In certain implementations, the evaporator may include a reservoir and a sparger, the reservoir disposed along the flow path and in fluid communication with the outlet section, and the sparger defining a plurality of orifices disposed in the reservoir.

In some implementations, the heater may be controllable to maintain at least a portion of the flow path at a predetermined target temperature.

In certain implementations, the build volume and the outlet section of the evaporator may be movable relative to one another along at least two dimensions.

In some implementations, the spreader may include a roller rotatable to spread the powder to form the layer of the powder as the spreader and the build volume move relative to one another.

According to yet another aspect, a method for managing powder mobility in binder jet additive manufacturing may include spreading a layer of a powder across a build volume at least partially defined by a print box, directing a first material in a vapor phase to the layer, the first material undergoing deposition from the vapor phase to form a solid along the layer, and delivering a second material to the layer along a controlled two-dimensional pattern associated with the layer according to a computerized model of a three-dimensional object, wherein at least the second material operates to bind the powder in the layer along the controlled two-dimensional pattern.

In certain implementations, deposition of the first material from the vapor phase to the solid may occur along an entire x-y extent of the respective layer.

In some implementations, the first material may include one or more of naphthalene or iodine.

In certain implementations, the first material (e.g., water) may freeze at a first temperature, the second material (e.g., alcohol) may freeze at a second temperature lower than the first temperature, and the layer may be at a third temperature between the first temperature and the second temperature as the first material is deposited along the respective layer.

In some implementations, the method may further include heating the three-dimensional object to an elevated temperature, wherein the solid may sublimate from the three-dimensional object as the three-dimensional object is heated to the elevated temperature. Further, or instead, the second material may include at least one component of a binder system, and, at the elevated temperature, one or more of a degree of polymerization or a degree of crosslinking of the at least one component of the binder system may increase.

In certain implementations, deposition of the first material from the vapor phase to the solid may precede delivery the second fluid to the respective layer.

In some implementations, directing the first material in the vapor phase toward the respective layer of the powder may include moving the first material in the vapor phase in a mixture with a distribution gas to the layer of the powder. The distribution gas may be, for example, different from the first material. Additionally, or alternatively, the distribution gas may be substantially inert with respect to the first material.

According to still another aspect, a binder jet additive manufacturing may include spreading a layer of a powder across a build volume at least partially defined by a print box, directing a first fluid in a vapor phase toward the layer of the powder, and delivering a second fluid along the layer in a controlled two-dimensional pattern associated with the layer according to a computerized model of a three-dimensional object, at least one component of the second fluid delivered to the layer chemically reacting with the first fluid along the controlled two-dimensional pattern associated with the layer, wherein at least the second fluid operates to bind the powder in the layer along the controlled two-dimensional pattern.

In certain implementations, the second fluid may include a liquid medium in which the at least one component of the second fluid is dispersed, and the liquid medium is different from the first fluid. For example, the first fluid may be water, and the carrier liquid of the second fluid may be anhydrous. As a more specific example, the carrier liquid may be an anhydrous solvent in which the at least one component of the second fluid may be dissolved.

In some implementations, the at least one component of the second fluid may increase localization of the second fluid along the respective layer as compared to localization of the second fluid along the given layer prior to the chemical reaction of the first fluid and the at least one component of the second fluid.

In certain implementations, the chemical reaction of the first fluid and the at least one component of the second fluid may form a gel.

In some implementations, the chemical reaction of the first fluid and the at least one component of the second fluid may form at least one component of a binder along the controlled two-dimensional pattern associated with the layer.

In certain implementations, the first fluid may increase one or more of a degree of crosslinking or a degree of polymerization of the at least one component of the second fluid along the controlled two-dimensional pattern associated with the layer.

In some implementations, the at least one component of the second fluid includes one or more of a cyanoacrylate, silane, a silane-grafted polymer, or a moisture curable polyurethane.

In certain implementations, the chemical reaction of the first fluid and the at least one component of the second fluid may change a pH level of the at least one component of the second fluid along the controlled two-dimensional pattern associated with the layer.

In some implementations, the at least one component of the second fluid may include colloidal silica, and the chemical reaction of the first fluid and the at least one component of the second fluid may decrease the pH level of the colloidal silica.

In certain implementations, the at least one component of the second fluid may include pre-crosslinked unneutralized polyacrylic acid, and the chemical reaction of the first fluid and the at least one component of the second fluid may increase the pH level of the pre-crosslinked unneutralized polyacrylic acid.

In some implementations, the first fluid may include one or more of nitric acid, hydrogen chloride, ammonia, and carbon dioxide.

In certain implementations, the chemical reaction of the first fluid and the at least one component of the second fluid may flocculate an anti-sintering agent along the controlled two-dimensional pattern associated with the layer.

In some implementations, the first fluid may include a base (e.g., ammonia) having a pH level above 7, and the at least one component of the second fluid may include acid solubulized aluminum hydroxide, and the chemical reaction of the base and the acid solubulized aluminum hydroxide may precipitate aluminum hydroxide.

In certain implementations, the distribution gas may be substantially inert with respect to the first fluid.

According to yet another aspect, a method for managing powder mobility in binder jet additive manufacturing may include forming a layer of a powder in a build volume at least partially defined by a print box, the layer of the powder exposed to an environment defined by a build chamber, maintaining the environment in the build chamber at a predetermined relative saturation of a first fluid in a vapor phase in a mixture with a carrier gas, establishing, in the layer, a temperature below a dew point of the first fluid in the vapor phase in the mixture with the carrier gas such that at least some of the vapor phase of the first fluid in contact with the powder in the layer condenses to a liquid phase along the layer of the powder, and delivering a second fluid to the layer along a respective controlled two-dimensional pattern associated with the layer according to a computerized model of a three-dimensional object, wherein at least the second fluid operates to bind the powder in the layer along the controlled two-dimensional pattern.

In certain implementations, forming the layer may include spreading powder at a temperature above the dew point of the first fluid in the vapor phase in the mixture with the carrier gas. Further, or instead, establishing the temperature of the layer below the dew point may include cooling the layer to a temperature below the dew point.

In some implementations, forming the layer may include forming a non-condensing region in front of a spreader moving the powder across the build volume to form the layer. For example, forming the non-condensing region may include drying a portion of the environment in front of the spreader moving the powder across the build volume to form the layer.

In certain implementations, maintaining the predetermined relative saturation of the first fluid in the vapor phase in the mixture with the carrier gas in the build chamber may include introducing the first fluid in the vapor phase into the build chamber at a volumetric flow rate greater than or substantially equal to a volumetric rate of condensation of the first fluid from the vapor phase to the liquid phase along the layer of the powder.

In some implementations, maintaining the predetermined relative saturation of the first fluid in the vapor phase in the mixture with the carrier gas may include moving the mixture through the build chamber.

In certain implementations, the predetermined relative saturation of the first fluid in the vapor phase in the mixture with the carrier gas may be greater than about 10 percent and less than about 90 percent.

In some implementations, a volume of the first fluid in the vapor phase in the environment in the build chamber may be greater than the volume of void space defined by the powder in the layer.

In certain implementations, condensation of the first fluid from the vapor phase to the liquid phase in the layer may precede delivering the second fluid to the layer along the controlled two-dimensional pattern.

In some implementations, the second fluid may be delivered to the layer at a temperature substantially equal to or greater than the temperature of the layer.

BRIEF DESCRIPTION OF THE DRAWINGS

The devices, systems and methods described herein are set forth in the appended claims. However, for the purpose of explanation, several implementations are set forth in the following drawings:

FIG. 8 is a flowchart of an exemplary method for managing powder mobility in binder jet additive manufacturing using vapor deposition.

DESCRIPTION

Figure 1A:
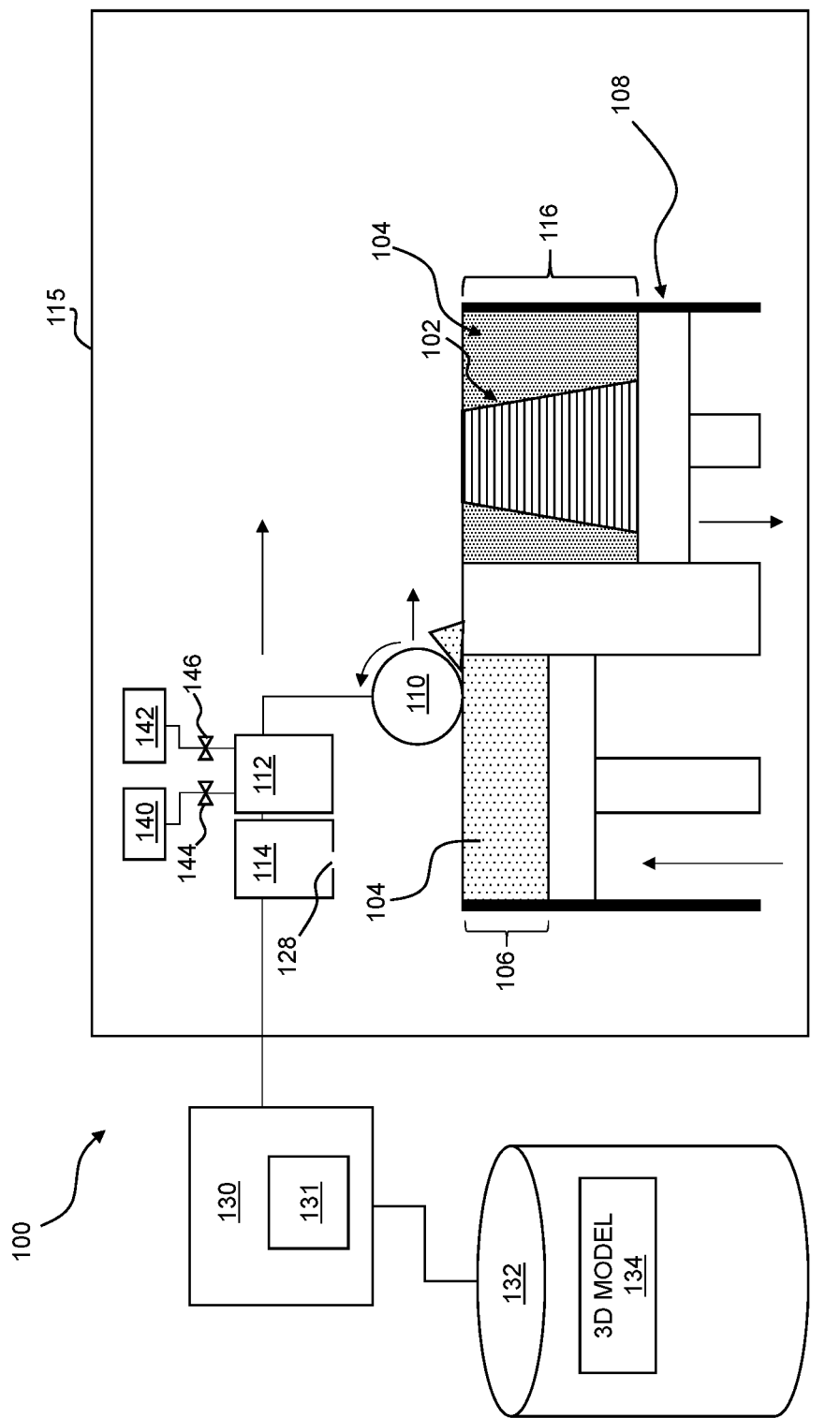
FIG. 1A is a schematic representation of an additive manufacturing system for forming a three-dimensional object, the additive manufacturing system shown at a first time prior to formation of a layer of a three-dimensional object.

Embodiments will now be described with reference to the accompanying figures. The foregoing may, however, be embodied in many different forms and should not be construed as limited to the illustrated embodiments set forth herein.

All documents mentioned herein are hereby incorporated by reference in their entirety. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," or the like) provided herein, is intended merely to better illuminate the embodiments and does not pose a limitation on the scope of the embodiments. No language in the specification should be construed as indicating any unclaimed element as essential to the practice of the embodiments.

In the following description, it is understood that terms such as "first," "second," "top," "bottom," "up," "down," and the like, are words of convenience and are not to be construed as limiting terms.

As used herein, the term binder jetting shall be understood to refer to any manner and form of additive manufacturing including layer-by-layer spreading of a powder along a build volume and controlling distribution of one or more materials that may operate to bind at least a portion of the powder in each layer according to a respective predetermined two-dimensional pattern associated with the given layer. Binding, in this context, shall be understood to include joining at least a portion of the powder in a given layer to itself and to similarly joined powder in one or more adjacent layers of the powder to define a three-dimensional object in the build volume. That is, the three-dimensional object formed through such binding shall be understood to be a contiguous shape having greater adhesion to itself than to unbound particles of the powder in the build volume. In certain instances, the three-dimensional object may be processed in the build volume to facilitate removal of the three-dimensional object from the unbound particles in the build volume for additional processing to form a final part. Further, or instead, unless otherwise indicated or made clear from the context, the one or more materials that may operate to bind at least a portion of the powder may do so through any of various different direct or indirect mechanisms that may, but need not, occur before a subsequent layer is spread as part of the layer-by-layer process. By way of example, therefore, such mechanisms may include directly binding the powder in a given layer upon deposition of the one or more materials along the layer. This may also or instead include an application of a material or a combination of materials that locally reacts (e.g., precipitates) a binder or a component of a binder, or that otherwise operates to bind particles of the powder in a spatially controlled manner to facilitate fabrication of a three-dimensional object within the powder in the build volume.

In the disclosure that follows, binder jetting processes are described with respect to components moving over a print box defining a build volume. As should be readily understood, however, this is a convention used for the sake of clarity and economy of explanation. Thus, unless otherwise specified or made clear from the context, it should be appreciated that any manner and form of relative movement of components may be used to carry out any one or more of the binder jetting processes described herein. Thus, for example, the print box may be, further or instead, movable with respect to one or more other components to achieve relative movement of components, as necessary to carry out any one or more of the binder jetting processes described herein.

Also, in the context of the present disclosure, mobility of a powder shall be understood to refer to an aggregate ability of particles of the powder to move relative to one another along, within, or out of a given volume (e.g., an entire layer or a portion of a layer, as the context may dictate). Such mobility may be observed as a change in shape or density of at least a portion of a layer of particles of the powder in response to an external force exerted on the layer. Unless otherwise specified or made clear from the context, mobility is generally used in the present disclosure as a relative parameter in comparing two states of at least a portion of a layer of a powder. For example, a reduction in mobility of a layer of a powder shall be understood to refer to a state of a layer of a powder that, as compared to a state of the same layer of powder prior to treatment, has become less prone to movement in response to a given force. Powder with such reduced mobility may be said to be locked. More specifically, in the context of the binder jetting, such a reduction in mobility of a layer of a powder may correspond to a reduced likelihood of ejection of particles of the powder in response to impact of droplets of fluid delivered to the layer of the powder. An additional or alternative benefit of the condensation of vapor into the powder is that the cohesive force due to the presence of the liquid may draw the powder particles closer together and result in an increase in the density of the powder in the build volume, for example by causing the powder in a build volume to compress vertically, in the direction of gravitational force. This may have a beneficial effect of increasing density of the three-dimensional object in the build volume. With a higher density, the three-dimensional object may be less prone to slumping and distortion during subsequent processing, including during sintering to full density. The densification of the powder in the build volume due to the action of the condensed vapor may, further, or instead, have a benefit with respect to decreasing mobility of the powder. That is, under otherwise identical conditions, it is generally observed that powder with a higher packing density may be less mobile than powder with a lower packing density. It should be understood that this effect may be complementary and, in some cases, at least partially additive to the cohesive effect of the liquid which has been condensed from the vapor.

In the context of the present disclosure, the term layer shall be understood to include a distribution of particles of powder defining a volume (e.g., a substantially rectangular cuboid) having length, width, and depth dimension. According to the convention used herein, the length and width of a given layer shall be understood to be defined along a plane parallel to movement of a spreader used to spread the powder along a build volume, and the depth of the given layer shall be understood to be defined by the dimension of the given layer in a direction perpendicular to the plane defining the length and width of the given layer. For the sake of clarity of explanation, it should be appreciated that the length, width, and depth of a layer may be referred to, respectively, as the x, y, z dimensions of the layer. Thus, for example, the x-y extent of a layer should be understood to refer to the area of the layer defined by the length and width of the layer. Unless otherwise specified or made clear from the context, the depth of a layer should be understood to be significantly smaller (e.g., at least an order of magnitude smaller and, in some cases, at least four orders of magnitude smaller) than the one or both of the width and length of the layer. As described in greater detail below, any one or more of the binder jetting processes described herein may be carried out by forming successive layers on top of one another such that a three-dimensional object is built up along the z-direction corresponding to the z-dimension of the successively formed layers. In each layer, one or more materials that may operate to bind the particles of the powder may be delivered along the x-y extent of the respective layer in a controlled two-dimensional pattern (e.g., based on a model of the three-dimensional object being formed). Unless otherwise specified or made clear from the context, the one or more materials along the controlled two-dimensional pattern may penetrate the depth of the respective layer such that the given layer may be bound to one or more preceding layers to form a three-dimensional object.

In view of the foregoing, it should be appreciated that binding powder and reducing mobility of powder each refer to restricting movement of the powder during binder jetting processes, although these typically refer to different degrees of immobilization associated with different fabrication objectives. For example, binding powder should be generally understood to refer to a greater degree and/or extent of restriction in movement of the particles of the powder consistent with retaining a three-dimensional shape of a printed object, as compared to reducing mobility of the powder to mitigate particle movement during printing. Thus, binding will generally couple particles more securely than mobility reduction. However, this is not strictly required in all cases, and there may be circumstances (e.g., where a curable binder is applied but not yet cured and/or a mobility-reducing agent is applied but not yet evaporated) in which mobility reduction binds powder more securely than a binder. In any case, unbound powder with reduced mobility should be understood to be separable from bound powder defining the three-dimensional object in a manner that permits retrieval of the three-dimensional object from a build volume at an appropriate time during fabrication.

Referring now to a temporal progression shown in FIGS. 1A-1D, an additive manufacturing system 100 may be used to form a three-dimensional object 102 from particles 103 (e.g., metallic particles, ceramic particles, polymeric particles, or a combination thereof) of a powder 104. The additive manufacturing system 100 may include a powder supply 106, a print box 108, a spreader 110, an evaporator 112, and a printhead 114 at least partially exposed to a controlled atmosphere of a build chamber 115. In general, the evaporator 112 may improve a binder jetting process by addressing certain physical challenges associated with accurately delivering a binder to a powder in a layer-by-layer fabrication. For example, as described in greater detail below, the evaporator 112 may advantageously introduce vapor into a binder jetting process to reduce the likelihood of ejection of the particles 103 of the powder 104 (which may degrade hardware immediately or over time) while maintaining fidelity of an intended two-dimensional pattern of a binder or a component of a binder system delivered to the powder 104 from the printhead 114. The overall result, therefore, is that the additive manufacturing system 100 including the evaporator 112 may facilitate forming the three-dimensional object 102 with a high degree of dimensional accuracy and, further or instead, may reduce downtime associated with hardware degradation.

In use, as shown in the temporal progression in FIGS. 1A-1D, the spreader 110 may be movable from the powder supply 106 to the print box 108 and along the print box 108 to spread a layer 118 of the powder 104 across a build volume 116 at least partially defined by the print box 108. In some instances, a portion of the build volume 116 may extend above the print box 108 by one or more layers, depending on a standoff (i.e., vertical clearance) of the spreader 110 relative to the print box 108. In such instances, each instance of the layer 118 may be spread above the portion of the build volume 116 defined by the print box 108 and, as the layer-by-layer fabrication process continues, at least some instances of the layer 118 may move into the portion of the build volume 116 defined by the print box 108. Thus, in general, the build volume 116 shall be understood to be any volume defined by a plurality of instances of the layer 118 of the powder 104 stacked on top of one another and holding an overall shape, whether through angle of repose of the powder 104, support from the print box 108, or a combination thereof.

Continuing with the temporal progression shown in FIGS. 1A-1D, the evaporator 112 and the printhead 114 may be movable (e.g., in coordination with one another and, optionally, in coordination with movement of the spreader 110) over the build volume 116 such that the evaporator 112 may direct a vapor phase of a first fluid 120 to the layer 118 of the powder 104 disposed along the top of the build volume 116, and the printhead 114 may deliver a second fluid 122 (e.g., a binder or a component of a binder system) along a controlled two-dimensional pattern associated with the layer 118 of the powder 104 disposed along the top of the build volume 116. The additive manufacturing system 100 may repeat one or more of these steps for each instance of the layer 118 in a plurality of instances of the layer 118 such that the second fluid 122 (and, in some instances, at least a portion of the first fluid 120) operates to bind at least some of the powder 104 in the plurality of instances of the layer 118 to define the three-dimensional object 102.

In general, as compared to directing a liquid phase of the first fluid 120 toward the powder 104 under otherwise identical conditions, condensing the vapor phase of the first fluid 120 has been observed to be more effective at imparting cohesive strength to the powder 104 of the layer 118 with a reduced likelihood of bleeding of second fluid 122. In particular, this difference between the liquid phase and the vapor phase has been observed in instances in which the first fluid 120 is water which, given its availability and ease of handling, may form a basis of a variety of useful implementations. Without wishing to be bound by theory, this observed difference in effectiveness between the liquid phase and the vapor phase of the first fluid 120 is believed to be attributable to more effective penetration of the vapor phase of the first fluid 120 into void space 124 defined between the particles 103 of the layer 118. That is, delivery of a liquid phase of the first fluid 120 in the form of small droplets floating in a gas (a mixture commonly referred to as a mist) to the layer 118 tends to collect on top of the layer 118 such that a reduction in particle ejection is achievable only with large quantities of the first fluid 120 and such large quantities form pathways for the second fluid 122 to undergo unintentional, lateral spreading, also referred to herein as bleeding, beyond the controlled two-dimensional pattern associated with the second fluid 122 along the layer 118. By comparison, however, the vapor phase of the first fluid 120 may condense onto and into the layer 118 creating suction that draws the first fluid 120 further into the layer 118. This generally increases the likelihood that a liquid phase of the first fluid 120 may wet a larger number of necks 126 defined by contact between adjacent instances of the particles 103.

Because the liquid phase of the first fluid 120 holds the particles 103 together at the necks 126 (e.g., through capillary force), the improved penetration of the vapor phase of the first fluid 120—and the associated increased likelihood of the presence of the liquid phase of the first fluid 120 at the necks 126—has been observed to result in a significant reduction in mobility of the particles 103 while requiring only a small amount of the first fluid 120. Without wishing to be bound by theory, it is believed that the Kelvin effect may prevent or reduce the likelihood of re-evaporation of the first fluid 120 in the high radius of curvature at the necks 126, where the first fluid 120 acts on the particles 103. The net result is that, while most of the first fluid 120 may re-evaporate quickly, the small amount of the first fluid 120 at the necks 126 may resist re-evaporation (and, in some cases, may never re-evaporate) such that the first fluid 120 at the necks may continue to reduce mobility of the particles 103 even as some of the first fluid 120 evaporates. Stated differently, the vapor phase of the first fluid 120 may advantageously reduce the likelihood of particle ejection while using an amount of the first fluid 120 that produces little or no bleeding of the controlled two-dimensional pattern of the second fluid 122 delivered to the layer 118. Further, or instead, as compared to directing a liquid phase of the first fluid 120 to the layer 118, the use of the vapor phase of the first fluid 120 may be less likely to roughen a top surface of the layer 118 along the top of the build volume 116. For example, as compared to the liquid phase of the first fluid 120, the vapor phase of the first fluid 120 may be less like to cause coalescence of loose instances of the particles 103 of the powder 104 to form small balls along the layer 118. As one or more of the foregoing advantages are realized over a plurality of instances of the layer 118, resulting improvements in dimensional accuracy of the three-dimensional object 102 may be achieved.

Figure 1B:
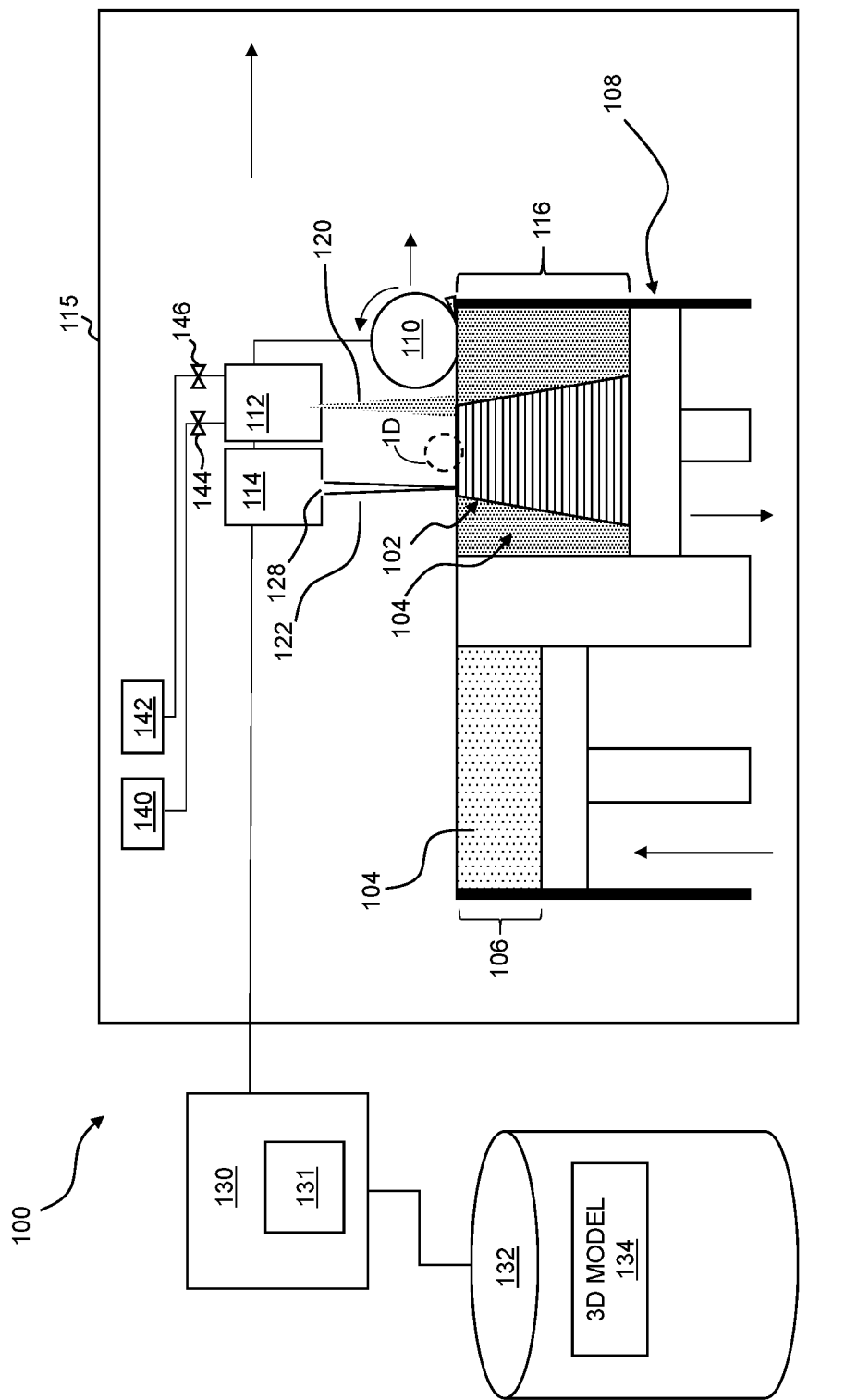
FIG. 1B is a schematic representation of the additive manufacturing system of FIG. 1A shown at a second time during formation of the layer of the three-dimensional object.
Figure 1C:
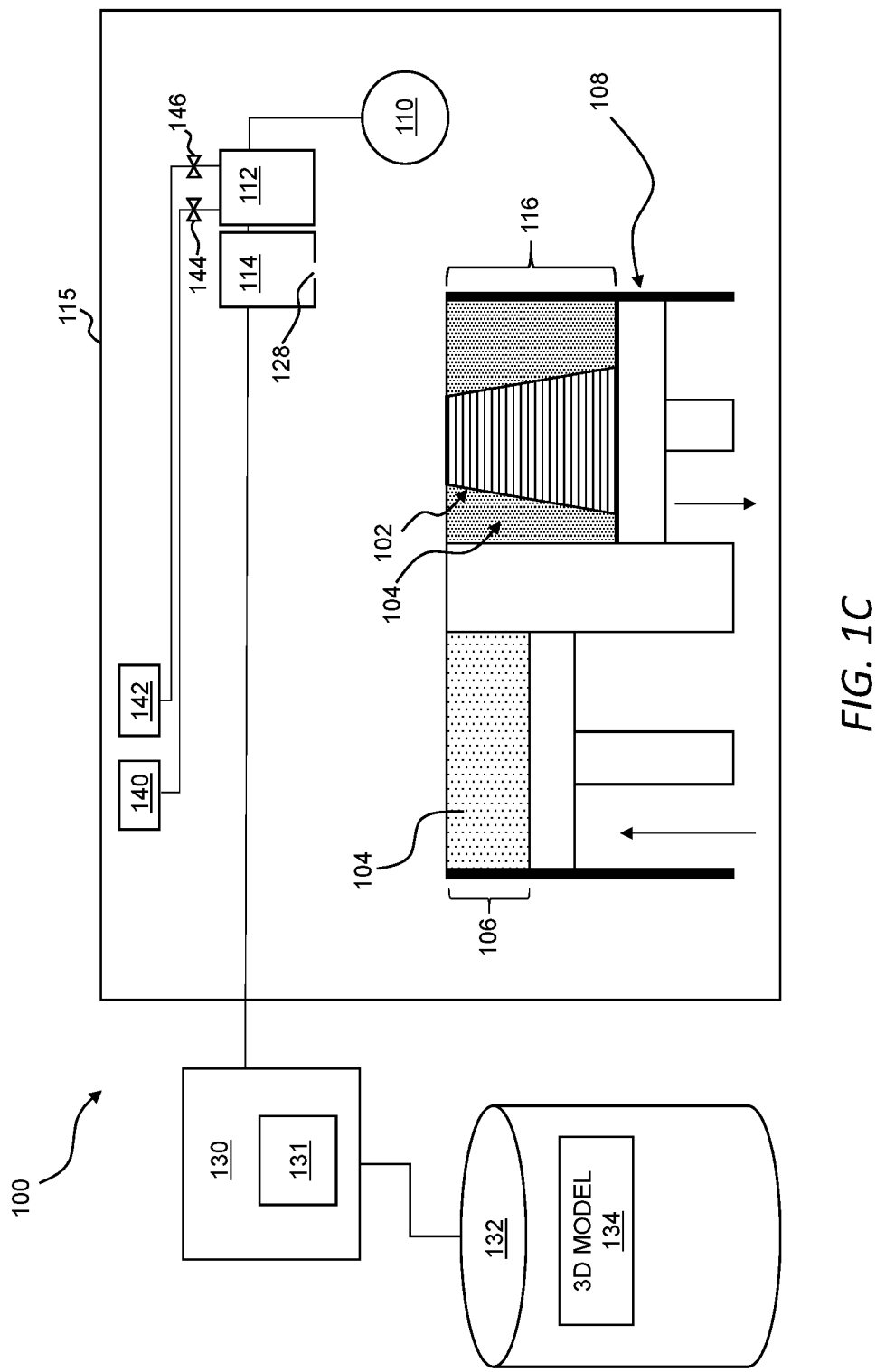
FIG. 1C is a schematic representation of the additive manufacturing system of FIG. 1A shown at a third time following formation of the layer of the three-dimensional object.
Figure 1D:
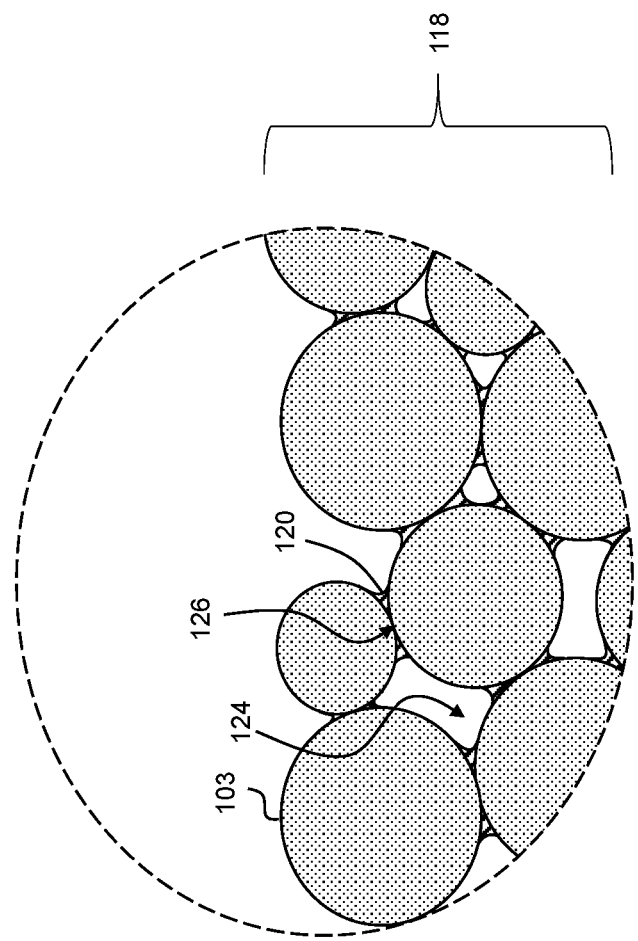
FIG. 1D is a schematic representation, along area of detail 1D in FIG. 1B, of a first fluid disposed along particles of a powder of the layer, the area of detail 1D corresponding to a time after a first fluid is directed to the layer but prior to delivery of a second fluid along the particles of the powder of the layer.

In general, a reduction in mobility of the powder 104 of the layer 118 should not be understood to require any particular distribution of the first fluid 120 with respect to each neck 126. That is, while wetting is shown in FIG. 1D as occurring at each of the necks 126, it should be appreciated that this an ideal distribution shown for the sake of clarity of illustration. Under certain conditions, some amount of the first fluid 120 may condense as small droplets on the surface of the particles 103, away from the necks 126. Further, or instead, the first fluid 120 may not reach all of the necks 126 formed by the particles 103 in the layer 118. However, provided that the liquid phase of the first fluid 120 is along enough of the necks 126 formed by the particles 103 in the layer 118, the mobility of the powder 104 may be reduced in the aggregate.

The spreader 110 may generally span at least one dimension of the build volume 116 such that the spreader 110 may distribute a layer of the powder 104 on top of the build volume 116 in a single pass. As an example, the spreader 110 may include a roller rotatable about an axis perpendicular to an axis of movement of the spreader 110 across the print box 108. The roller may be, for example, substantially cylindrical. In use, rotation of the roller about the axis perpendicular to the axis of movement of the spreader 110 may spread the powder 104 from the powder supply 106 to the print box 108 and form the layer 118 of the powder 104 along the build volume 116. It should be appreciated, therefore, that a plurality of instances of the layer 118 of the powder 104 may be formed in the build volume 116 through repeated movement of the spreader 110 across the build volume 116. The spreader 110 may be moved over the build volume 116 to form the layer 118 of the powder 104 with a substantially uniform depth over the width and length—the x-y extent—of the layer 118, subject to dimensional variations attributable to typical manufacturing tolerances. This depth may be, for example, about 50 microns, although other dimensions are additionally or alternatively possible. For example, the depth of the layer 118 may be a function of any one or more of various different factors, including, for example, the size of the particles 103, the size of the three-dimensional object 102 being formed, speed of fabrication, and depth of penetration of the second fluid 122 of the powder 104 on top of the build volume 116. Further, or instead, the depth of the layer 118 may be substantially the same for each instance of the layer 118 in a plurality of instances of the layer 118 formed during fabrication of the three-dimensional object 102, again subject to dimensional variations attributable to typical manufacturing tolerances. Thus, continuing with the example above, each instance of the layer 118 may be greater than about 50 microns and less than about 200 microns (e.g., about 65 microns).

The printhead 114 may define at least one instance of an ejection orifice 128 directed toward the build volume 116 as the printhead 114 moves across the build volume 116. For the sake of clarity of illustration and explanation a single instance of the ejection orifice 128 is shown and described. Typically, however, the printhead 114 may define hundreds of instances of the ejection orifice 128 directed toward the build volume 116. As instances of the ejection orifice 128 become degraded over time, the performance of the printhead 114 may become compromised to a degree that impacts one or more of dimensional accuracy or strength of the three-dimensional object 102. The use of the vapor phase of the first fluid 120 to reduce mobility of the particles 103 of the powder 104, as described herein, may reduce the likelihood of certain degradations in performance of the printhead 114 associated with ejection of the particles 103 of the powder 104, especially degradations in performance resulting from ejected instances of the particles 103 reaching and, in some cases, attaching to the bottom of the printhead 114. Thus, for example, the vapor phase of the first fluid 120 may reduce the likelihood of clogging one or more instances of the ejection orifice 128 that may result from ejection of the particles 103 of the powder 104. Further, or instead, the vapor phase of the first fluid 120 may reduce the likelihood of unintended changes to wetting characteristics along the bottom of the printhead 114 that may be caused by ejected instances of the particles 103 attaching to the bottom of the printhead 114.

The printhead 114 may include any one or more of various different types of activation mechanisms suitable for controlled delivery of the second fluid 122. Thus, for example, the printhead 114 may be a piezoelectric printhead including one or more piezoelectric elements. Continuing with this example, each piezoelectric element may be associated with a respective instance of the at least one instance of the ejection orifice 128 and, in use, each piezoelectric element may be selectively actuated such that displacement of the piezoelectric element may expel the second fluid 122 from the respective one of the at least one instance of the ejection orifice 128. Additionally, or alternatively, the printhead 114 be a thermal inkjet printhead including thermal elements that may be selectively heated to force expansion of the second fluid 122 through the at least one instance of the ejection orifice 128 and toward the build volume 116.

In certain implementations, the second fluid 122 may be a single liquid formulation ejected from the at least one instance of the ejection orifice 128 of the printhead 114. In some implementations, however, the second fluid 122 may include a plurality of liquid formulations, and the printhead 114 may expel the plurality of liquid formulations from the at the least one ejection orifice 128 as necessary to achieve a desired distribution of the plurality of liquid formulations. For example, the printhead 114 may expel a plurality of solvents, a plurality of components of a binder system, or both from the at least one instance of the ejection orifice 128. While the printhead 114 is described as a single printhead for the sake of clarity of explanation, it should be appreciated that the printhead 114 may, additionally or alternatively, include a plurality of printheads from which the second fluid 122 may be delivered toward the build volume 116.

In general, the printhead 114 may be controlled to jet the second fluid 122 toward the build volume 116 in a controlled (e.g., predetermined) two-dimensional pattern to the layer 118, and this may be repeated for respective controlled two-dimensional patterns on a layer-by-layer basis to define the three-dimensional object 102 in the build volume 116. In certain implementations, the printhead 114 may extend axially along substantially an entire dimension of the build volume 116 in a direction perpendicular to a direction of movement of the printhead 114 over the build volume 116 to carry out one-dimensional scanning. For example, in such implementations, a plurality of instances of the ejection orifice 128 of the printhead 114 may be arranged along the axial extent of the printhead 114, and the second fluid 122 may be selectively jetted from these instances of the ejection orifice 128 along the axial extent to form a controlled two-dimensional pattern of the second fluid 122 along the layer 118 of the powder 104 as the printhead 114 moves in a single direction across the build volume 116. Additionally, or alternatively, the printhead 114 may be movable in two dimensions above and parallel to an x-y extent of the layer 118 of the powder 104 along the build volume 116 to deliver a controlled two-dimensional pattern of the second fluid 122 along the layer 118 through two-dimensional scanning.

Referring now to FIGS. 1A-1D and 2, the evaporator 112 may be securable to any one or more portions of the additive manufacturing system 100 to support the evaporator 112 above the build volume 116. For example, the evaporator 112 may be coupled to one or more actuators controllable to move the evaporator 112 over the build volume 116 as part of any one or more of the binder jetting processes described herein. Further or instead, the evaporator 112 may be directly or indirectly coupled to one or more of the spreader 110 or the printhead 114. Still further or instead, while the powder supply 106 may be stationary along a lateral portion of the build volume 116 in some instances, the powder supply 106 may alternatively be movable over the build volume 116 to dispense and meter the powder 104 in advance of movement of the spreader 110 over the build volume 116, such as described in U.S. patent application Ser. No. 15/959,096, filed Apr. 20, 2018, the entire content of which is hereby incorporated herein by reference. In such implementations in which the powder supply 106 is movable over the build volume 116, the evaporator 112 may additionally or alternatively be directly or indirectly coupled to the powder supply 106.

The evaporator 112 may include a housing 201 defining an inlet section 202, and outlet section 204, and a flow path 206 extending therebetween such that the inlet section 202 and the outlet section 204 are in fluid communication with one another via the flow path 206. In general, it should be appreciated that any of various different approaches may be used to form the first fluid 120 into the vapor phase between the inlet section 202 and the outlet section 204 of the evaporator 112. For example, such approaches may include changing one or more of temperature or pressure of the liquid phase of the first fluid 120 between the inlet section 202 and the outlet section 204 of the evaporator 112 to form the vapor phase of the first fluid 120. For the sake of clarity of explanation, however, the example that follows describes the formation of the vapor phase of the first fluid 120 in the context of a particular technique known as sparging. While this technique may be useful for forming the vapor phase of the first fluid 120 at a temperature below the boiling point of the first fluid 120, it should not be considered to be limiting, unless explicitly stated or made clear from the context. For example, as described in greater detail below, the vapor phase of the first fluid 120 may be formed through any one or more of various different techniques (e.g., techniques making use of atomization) suitable for forming the vapor phase of the first fluid 120 at a temperature at or above the boiling point of the first fluid 120.

The inlet section 202 and the outlet section 204 may be sized relative to one another to accommodate expansion associated with evaporating a liquid phase of the first fluid 120 in the evaporator 112 to form the vapor phase of the first fluid 120 issuable from the evaporator 112. That is, the inlet section 202 may have a first open area sized for flow of the liquid phase of the first fluid 120 into the evaporator 112, and the outlet section 204 may have a second open area sized for flow of the vapor phase of the first fluid 120, alone or in combination with one or more gases, from the evaporator 112 and toward the layer 118. In this context, the first open area of the inlet section 202 should be understood to refer to refer to a minimum flow restriction along the inlet section 202 and, similarly, the second open area of the outlet section 204 should be understood to refer to a minimum flow restriction along the outlet section 204. To accommodate differences in density between the liquid phase of the first fluid 120 and the vapor phase of the first fluid 120 and/or one or more gases mixed with the vapor phase of the first fluid 120, a ratio of the second open area of the outlet section 204 to the first open area of the inlet section 202 may be greater than about 10:1 and less than about 5,000:1.

In certain instances, at least a portion of the flow path 206 between the inlet section 202 and the outlet section 204 may be nonlinear. Such nonlinearity may be useful, for example, for separating the liquid phase of the first fluid 120 from the vapor phase of the first fluid 120 within the evaporator 112. More specifically, at least a portion of the flow path 206 may be nonlinear to act as a trap for the liquid phase of the first fluid 120 upstream of the outlet section 204 to reduce the likelihood of inadvertently delivering the liquid phase of the first fluid 120 to the layer 118.

In general, the outlet section 204 of the evaporator 112 may precede movement of the printhead 114 over the build volume 116 in at least one direction. Additionally, or alternatively, the spreader 110 may be movable over the build volume 116 and relative to the outlet section 204 of the evaporator 112 to precede movement of the outlet section 204 of the evaporator 112 over the build volume 116 in at least one direction. Thus, for example, the spreader 110 may spread the layer 118 of the powder 104 on top of the build volume 116, the outlet section 204 may follow the spreader 110 over the build volume 116 to direct the vapor phase of the first fluid 120 onto the layer 118 of the powder 104 on top of the build volume 116, and the printhead 114 may follow the outlet section 204 of the evaporator 112 over the build volume 116 to deliver the second fluid 122 (e.g., a binder or a component of a binder system) onto the layer 118 of the powder 104 on top of the build volume 116. In this example, because the first fluid 120 is introduced into the layer 118 prior to delivery of the second fluid 122 to the layer 118, it should be appreciated that the first fluid 120 may reduce mobility of the particles 103 of the powder 104 (e.g., by imparting increased cohesive strength to the layer 118) and, thus, the particles 103 of the powder 104 may be less likely to be ejected from the layer as the second fluid 122 impacts the layer 118.

In certain implementations, as the outlet section 204 moves over the layer 118, the outlet section 204 may have a substantially fixed standoff clearance (i.e., vertical separation distance) relative to the layer 118. In this context, the substantially fixed nature of the standoff clearance should be understood to allow for small fluctuations in position (e.g., due to vibration) that may occur as components of the additive manufacturing system 100 move back and forth over the build volume 116. In general, a lower bound of the standoff clearance may be a function of a minimum distance required to avoid contact between the outlet section 204 and the layer 118 (even as typical vibrations occur). Further, or instead, an upper bound of the standoff clearance may be a function of a maximum distance at which the vapor phase of the first fluid 120 may be delivered from the outlet section 204 to the layer 118 with little or no premature condensation above the layer 118. In view of these competing considerations, the standoff clearance between the outlet section 204 and the layer 118 may be greater than about 0.5 mm and less than about 20 mm (e.g., less than about 5 mm).

The outlet section 204 may be dimensioned relative to the build volume 116 based, for example, on the type of scanning used to deliver the vapor phase of the first fluid 120 in a direction from the evaporator 112, toward the layer 118 on top of the build volume 116. For example, the outlet section 204 may span an axial dimension of the build volume 116 perpendicular to a one-dimensional scanning movement of the outlet section 204 over the build volume 116 such that the entire x-y extend of the layer 118 may be traversed in a single, one-dimensional scan of the outlet section 204 over the build volume. Because such a one-dimensional scan can deliver the vapor phase of the first fluid 120 without overlapping regions along the layer 118, one-dimensional scanning may facilitate achieving a substantially uniform distribution of the first fluid 120 to the layer 118. With such a substantially uniform distribution of the first fluid 120, the response of the layer 118 to impingement by the second fluid 122 may be consistent and repeatable, ultimately benefiting dimensional accuracy of the three-dimensional object 102 being formed.

The outlet section 204 may include a slit or, another substantially elongate shape, from which the vapor phase of the first fluid 120 may be directed toward the layer 118 of the powder 104. Continuing with this example, the length of the slit or other elongate shape may span at least one dimension of the build volume 116 in instances in which the vapor phase of the first fluid 120 is directed toward the layer 118 through one-dimensional scanning. Because the slit may be formed without obstructions, the flow of the vapor phase of the first fluid 120 may be substantially uniform along the outlet section 204 which, in turn, may impart benefits in uniformity of distribution of the first fluid 120 to the layer 118. Additionally, or alternatively, other shapes of the outlet section 204 may be implemented. For example, the housing 201 may define a plurality of openings (e.g., a series of holes or small slits) along the outlet section 204. That is, continuing with this example, the material of the housing 201 between the plurality of openings may form structural elements that may advantageously impart dimensional stability to the outlet section 204.

Further, or instead, while the outlet section 204 has been described as being movable in a one-dimensional scanning operation, it should be appreciated that the outlet section 204 may, alternatively or additionally, be movable along at least two dimensions along an x-y extent of the build volume 116 to deliver the vapor phase of the first fluid 120 to the layer 118 through two-dimensional scanning. More specifically, the outlet section 204 may be movable over the build volume 116 to direct the vapor phase of the first fluid 120 substantially along only the controlled two-dimensional pattern, in a given layer, associated with delivery of the second fluid 122 from the at least one instance of the ejection orifice 128 of the printhead 119 to the layer 118. As compared to directing the vapor phase of the first fluid 120 to the entire x-y extent of the layer, selective delivery of the vapor phase of the first fluid 120 along the controlled two-dimensional pattern associated with the second fluid 122 may facilitate further reducing the likelihood of bleeding of the second fluid 122. This may be useful, for example, for accurately forming small features in the three-dimensional object 102.

In certain implementations, the evaporator 112 may form a mixture of the vapor phase of the first fluid 120 with a carrier gas 213a in combination with a distribution gas 213b such that the mixture is directed toward the layer 118 of the powder 104. As used herein, the carrier gas 213a and the distribution gas 213b refer to gases used with respect to different aspects of forming the mixture. That is, the carrier gas 213a may be a gaseous medium in which the vapor phase of the first fluid 120 becomes saturated and, thus, the carrier gas 213a may control an amount (e.g., a mass) of the vapor phase of the first fluid 120 in the mixture. Further, or instead, as used herein, the distribution gas 213b may be a gaseous medium movable through the evaporator 112 to mix with the vapor phase of the first fluid 120 saturated in the carrier gas 213a to impart one or more desired flow characteristics (e.g., direction, velocity, or a combination thereof) to the mixture issuing from the outlet section 204, toward the layer 118. For the sake of describing certain aspects of forming and directing the vapor phase of the first fluid 120 through the evaporator 112, the carrier gas 213a and the distribution gas 213b are described as being used in combination with one another in the example that follows. As described in greater detail below, however, the vapor phase of the first fluid 120 may additionally or alternatively through other techniques, some of which may be carried out without one or more of a carrier gas or a distribution gas.

To facilitate decoupling the amount of the vapor phase of the first fluid 120 from the exit velocity through the outlet section 204, the carrier gas 213a and the distribution gas 213b may be independently controllable relative to one another. Further, or instead, to achieve suitable decoupling in certain instances, the carrier gas 213a and the distribution gas 213b may be separately introduced into the evaporator 112. In certain implementations, the carrier gas 213a and the distribution gas 213b may be substantially inert with respect to one or more of the first fluid 120, the particles 103 of the powder 104, or one another. Further, or instead, the carrier gas 213a and the distribution gas 213b may have the same composition.

The evaporator 112 may include a first port 210 and a second port 212. The first port 210 may define the inlet section 202 connectable in fluid communication with a liquid source 140, via a first flow controller 144, to receive a liquid form of the first fluid 120 from the liquid source 140. The second port 212 may be connectable to a gas source 142, via a second flow controller 146, to receive the carrier gas 213a. In certain implementations, the first flow controller 144 and the second flow controller 146 may include one or more of respective solenoid valves, linearly acting flow control valves, or other similar actuatable valves, such that flow through one or more of the first port 210 or the second port 212 may be selectively interrupted by closing the first flow controller 144 and the second flow controller 146 to interrupt formation of a mixture of the vapor phase of the first fluid 120 and the carrier gas 213 between formation of successive instances of the layer 118. Such selective interruption in formation of the vapor phase of the first fluid 120 may, in turn, reduce unintended variation in environmental conditions above the build volume 116.

In some implementations, the mixture of the carrier gas 213 and the vapor phase of the first fluid 120 may be formed by sparging—that is, dissolving the first fluid 120 in the carrier gas 213. Thus, for example, the evaporator 112 may include a sparger 214 disposed along the reservoir 208. The reservoir 208 may be in fluid communication with the first port 210, and the sparger 214 may be in fluid communication with the second port 212. In use, the liquid phase of the first fluid 120 may be introduced into the reservoir 208 to a level sufficient to submerge at least a portion of the sparger 214 in the reservoir 208. The carrier gas 213 (e.g., air or nitrogen) may be introduced into the evaporator 112 via the second port 212 and bubbled, via the sparger 214, through a liquid phase of the first fluid 120 in the reservoir 208. As described in greater detail below, the amount of the first fluid 120 formed through sparging may be indirectly controlled based on directly controlling one or more of the temperature of the liquid form of the first fluid 120 in the reservoir 208 or a flow rate of the carrier gas 213a through the reservoir 208.

At the gas/liquid interface between bubbles 216 of the carrier gas 213a and the liquid form of the first fluid 120 in the reservoir 208, the vapor phase of the first fluid 120 may be introduced into the carrier gas 213a. Accordingly, the fluid exiting the reservoir 208—for example, above the reservoir 208—may include the vapor phase of the first fluid 120 saturated in the carrier gas 213a. The volume percentage of the vapor phase of the first fluid 120 in the mixture with the carrier gas 213a may be controlled by controlling, for example, temperature of the first fluid 120 in the reservoir 208. As a more specific example, the liquid phase of the first fluid 120 may be controlled to a predetermined temperature below the boiling point of the first fluid 120 and corresponding to a saturation temperature of a predetermined volumetric percentage of the vapor phase of the first fluid 120 in the carrier gas 213a. In instances in which the first fluid 120 is water and the carrier gas 213a is air, this saturation temperature may be greater than about 50° C. and less than about 90° C., corresponding to water content of greater than about 12 percent and less than about 70 percent. Thus, more generally, the evaporator 112 may form the vapor phase of the first fluid 120 below a boiling point of the first fluid 120, which may have safety advantages based at least on reduced heating requirements. As described in greater detail below, however, certain implementations of evaporators described herein may heat the first fluid 120 above a boiling point of the first fluid 120 to realize certain other advantages in delivering the vapor phase of the first fluid 120 to the layer 118.

With the volume percentage of the vapor phase of the first fluid 120 controlled based on the temperature of the liquid form of the first fluid 120 in the reservoir 208, the amount of the vapor phase of the first fluid 120 may be varied by varying the flow rate of the carrier gas 213a through the reservoir 208. That is, at a fixed temperature of the liquid form of the first fluid 120 in the reservoir 208, increasing the flow rate of the carrier gas 213a produces a greater amount of the vapor phase of the first fluid 120 along a portion of the flow path 206 above the reservoir 208. Similarly, at the fixed temperature of the liquid form of the first fluid 120 in the reservoir 208, decreasing the flow rate of the carrier gas 213a produces less of the vapor phase of the first fluid 120 above the reservoir 208.

The sparger 214 may define a plurality of orifices 215, such as may be defined by a porous structure (e.g., a porous metal) useful for forming a large number of the bubbles 216 of the carrier gas 213a as the carrier gas 213a moves through the sparger 214. The bubbles 216 formed by movement of the carrier gas 213a through the orifices 215 of the sparger 214 may be useful for enhancing introduction of the vapor phase of the first fluid 120 into the carrier gas 213a moving through the reservoir 208. That is, the bubbles 216 formed by the sparger 214 may be small such that there is a large contact area between the carrier gas 213 and the liquid phase of the first fluid 120. Such a large contact area may increase the likelihood that the bubbles 216 become saturated with the vapor phase of the first fluid 120 before the bubbles 216 reach the top of the reservoir 208. In general, under otherwise identical conditions, smaller bubbles may be useful for reducing the time and/or height of the liquid phase of the first fluid 120 required to saturate the vapor phase of the first fluid 120 into the bubbles 216 of the carrier gas 213a moving through the liquid phase of the first fluid 120 in the reservoir 208.

In certain implementations, the evaporator 112 may include a first heater 222 in thermal communication with the reservoir 208. The first heater 222 may be, for example, a cartridge heater extending into the reservoir 208. In use, the first heater 222 may be at least partially submerged in the liquid form of the first fluid 120. Additionally, or alternatively, the first heater 222 may be controllable to maintain the liquid phase of the first fluid 120 in the reservoir 208 at a predetermined target temperature, which may be useful for maintaining a target volumetric percentage of the vapor phase of the first fluid 120 in the mixture exiting the reservoir 208. For example, the heater 222 may maintain the predetermined temperature according to an open loop control approach or through closed loop control (e.g., based on an indication of temperature from the first heater 222 itself and/or from a separately positioned temperature sensor (not shown)).

The evaporator 112 may, in some instances, include a level sensor 224 disposed in the reservoir 208 to sense a level of the liquid phase of the first fluid 120 in the reservoir 208. For example, the level sensor 224 may provide feedback to a controller, such as any one or more of the controllers described herein. More specifically, based at least in part on a signal from the level sensor 224 the flow rate of the liquid phase of the first fluid 120 delivered to the reservoir 208, via the first port 210, may be adjusted. In some instances, the level sensor 224 may deliver a binary signal which, when the level of the first fluid 120 in the reservoir 208 is low, is used to open the first flow controller 144 leading to the first port 210, and when the level is high is used to close the first flow controller 144.

In some implementations, the evaporator 112 may include a second heater 226 in thermal communication with the flow path 206 to heat the mixture of the carrier gas 213a and the vapor phase of the first fluid 120 moving along the flow path 206 from the reservoir 208. In general, the second heater 226 may be positioned along any one or more portions of the flow path 206 to reduce the likelihood of condensation of the vapor phase of the first fluid 120 along the flow path 206, between the reservoir 208 and the outlet section 204. More specifically, the second heater 226 may be positioned along any one or more portions of the flow path 206 to maintain the flow path 206 at or above the temperature of the liquid form of the first fluid 120 in the reservoir 208. For example, the second heater 226 may maintain the flow path 206 at or above the predetermined temperature according to an open loop control approach or through closed loop control (e.g., based on an indication of temperature from the second heater 226 itself and/or from a separately positioned temperature sensor (not shown)).

As should be readily appreciated, any of various different arrangements of the second heater 226 may be used to maintain such an elevated temperature along the flow path 206. Thus, for example, the second heater 226 may extend continuously along the flow path 206, between the reservoir 208 and the outlet section 204. As another example, the second heater 226 may include spatially distributed sections along the flow path 206. Further, or instead, the second heater 226 may be any of various different types of heaters that may be controlled to a target temperature above the temperature of the liquid phase of the first fluid 120 in the reservoir. Thus, for example, the second heater 226 may be a pad heater that may be mounted directly to any one or more portions of the housing 201.

In certain instances, the housing 201 may define one or more auxiliary inlets 207 through which the distribution gas 213b may be introduced. As an example, the auxiliary inlets 207 may be positioned to introduce the distribution gas 213b to a portion of the flow path 206 above the reservoir 208 such that the flow of the distribution gas 213b may generally direct the mixture of the vapor phase of the first fluid 120 and the carrier gas 213a from the reservoir 208 toward the outlet section 204. This direction of the distribution gas 213b may be useful, for example, for reducing the likelihood of undesirable recirculation of flow above the reservoir 208. In instances in which the distribution gas 213b and the carrier gas 213a have the same composition, the distribution gas 213b may be received at the auxiliary inlets 207 via fluid communication with the gas source 142. In such implementations, the second flow controller 146 may, also or instead, control the flow of the distribution gas 213b through the auxiliary inlets 207. It should be appreciated, however, that the distribution gas 213b may be received from a separate source and, further or instead, the flow of the carrier gas 213a and the distribution gas 213b into the evaporator 112 may be controlled by any manner and form of flow controllers.

In certain implementations, the evaporator 112 may include a vapor probe 228 positioned to measure concentration of the vapor phase of the first fluid 120 issuing from the evaporator 112. For example, the vapor probe 228 may be near the outlet section 204 of the evaporator 112 and, optionally, may be movable along with the outlet section 204 of the evaporator 112 as the outlet section 204 of the evaporator 112 moves relative to the build volume 116. In some instances, the vapor probe 228 may be sensitive to prolonged use under conditions associated with the binder jetting processes described herein. Accordingly, the vapor probe 228 may be releasably securable to the evaporator 112. For example, the vapor probe 228 may be used as part of an initial set-up of the additive manufacturing system 100 to determine a volumetric concentration of the vapor phase of the first fluid 120 under conditions of a binder jetting process to be carried out for forming the three-dimensional object 102. Following the initial set-up of the additive manufacturing system 100, the vapor probe 228 may be removed from the evaporator 112 to reduce the likelihood of damage or degraded performance of the vapor probe 228. Additionally, or alternatively, the vapor probe 228 may be reattached to the evaporator 112 periodically to verify operation of the evaporator 112.

The selection of the vapor probe 228 may be based on the composition of the first fluid 120. For example, in instances in which the first fluid 120 is water, the vapor probe 228 may include a humidity probe, such as a probe including a polymer having a changing resistance or dielectric constant in the presence of water. For more general implementations and/or implementations in which the first fluid 120 is a substance other than water, the vapor probe 228 may include a chilled mirror cooled until condensation is detected as scatter of a laser deflected off of the chilled mirror.

Referring again to FIGS. 1A-1C, the additive manufacturing system 100 may further include a controller 130 in electrical communication with the powder supply 106, the print box 108, the spreader 110, the printhead 114, and the evaporator 112. The controller 130 may include one or more processors 131 operable to control one or more of the powder supply 106, the print box 108, the spreader 110, the printhead 114, and combinations thereof.

The one or more processors 131 of the controller 130 may execute instructions to control z-axis movement of one or more of the powder supply 106 and the print box 108 relative to one another as the three-dimensional object 102 is being formed. For example, the one or more processors 131 of the controller 130 may execute instructions to move the powder supply 106 in a z-axis direction toward the spreader 110 to direct the powder 104 toward the spreader 110 as each layer of the three-dimensional object 102 is formed and to move the print box 108 in a z-axis direction away from the spreader 110 to accept each new layer of the powder 104 along the top of the build volume 116 as the spreader 110 moves across the build volume 116. In general, the controlled movement of the print box 108 relative to the powder supply 106 is based on a thickness of a corresponding layer being formed in the build volume 116.

Additionally, or alternatively, the one or more processors 131 of the controller 130 may execute instructions to control movement of the spreader 110 from the powder supply 106 to the print box 108 to move successive layers of the powder 104 across the build volume 116. For example, the one or more processors 131 of the controller 130 may control speed of movement of the spreader 110 across the build volume 116. As a further or alternative example, the controller 130 may control one or more features of the spreader 110 useful for packing the top layer of the powder 104 as the spreader 110 moves across the build volume 116. Returning to the specific example of the spreader 110 being rotatable, the one or more processors 131 of the controller 130 may control rotation (e.g., speed, direction, or both) of the spreader 110.

The one or more processors 131 of the controller 130 may, further or instead, control the printhead 114. For example, the one or more processors 131 of the controller 130 may control movement (e.g., speed, direction, timing, and combinations thereof) of the printhead 114 across the build volume 116. Further, or instead, with at least one instance of the ejection orifice 128 disposed over the build volume 116, the one or more processors 131 may control the delivery of the second fluid 122 from the printhead 114 toward the layer 118 of the powder 104 along the top of the build volume 116. More generally, the one or more processors 131 may control the printhead 114 to deliver the second fluid 122 toward the layer 118 along a controlled two-dimensional pattern associated with the layer 118. The controlled two-dimensional pattern may vary from layer-to-layer, as necessary, according to the shape of the three-dimensional object 102 being defined layer-by-layer in the build volume 116.

The additive manufacturing system 100 may further, or instead, include a non-transitory, computer readable storage medium 132 in communication with the controller 130 and having stored thereon a three-dimensional model 134 and instructions for causing the one or more processors 131 to carry out any one or more of the methods described herein. In general, as sequential instances of the layer 118 are introduced to the build volume 116 and the second fluid 122 and the vapor phase of the first fluid 120 are delivered to each instance of the layer 118 in a plurality of sequential instances of the layer 118 of the powder 104, the three-dimensional object 102 is defined according to the three-dimensional model 134 stored in the non-transitory, computer readable storage medium 132. In certain implementations, the controller 130 may retrieve the three-dimensional model 134 in response to user input, and generate machine-ready instructions for execution by the additive manufacturing system 100 to fabricate the three-dimensional object 102.

Figure 3:
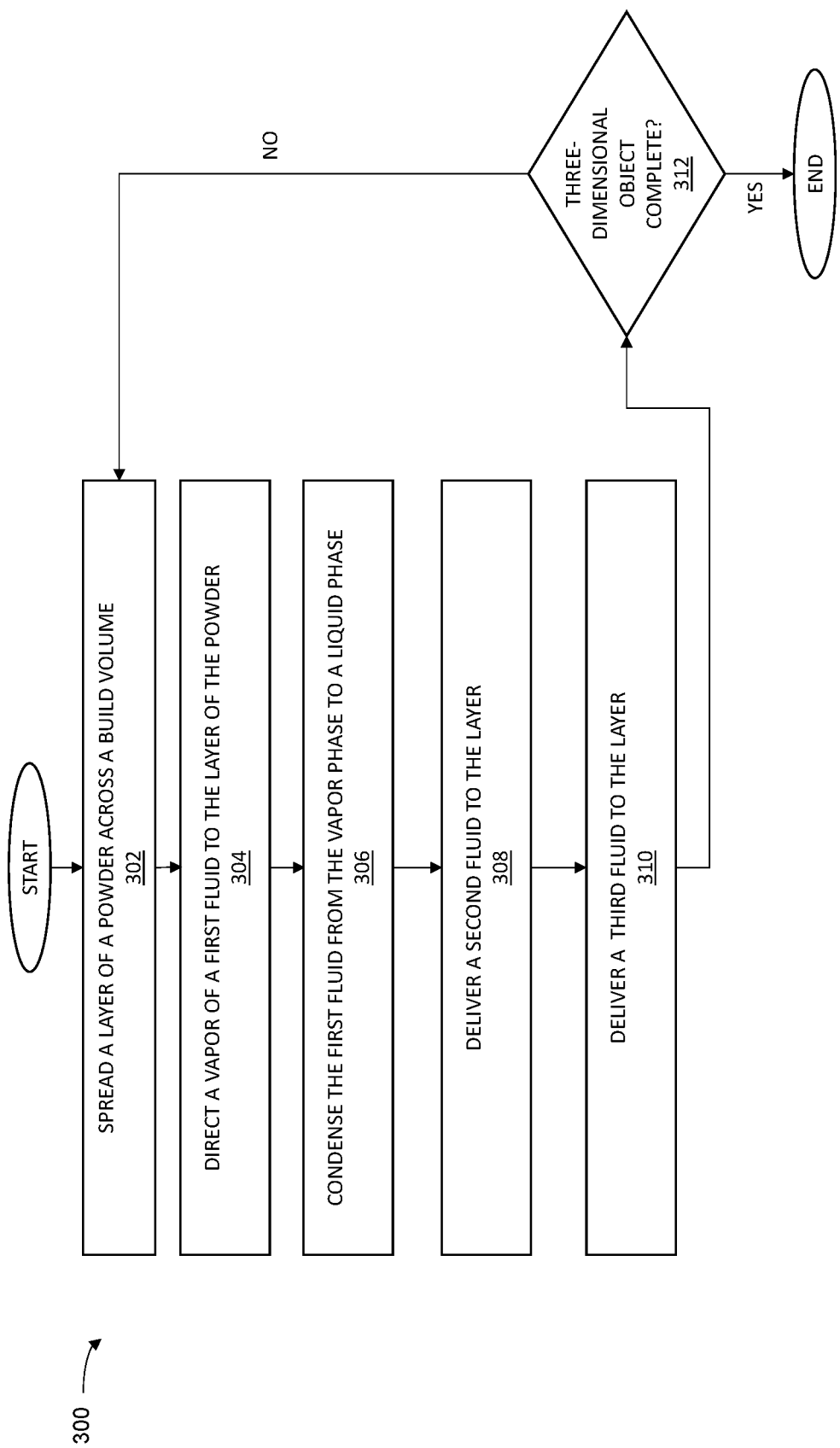
FIG. 3 is a flowchart of an exemplary method of managing powder mobility in binder jet additive manufacturing using a vapor phase of a fluid.
Figure 4:
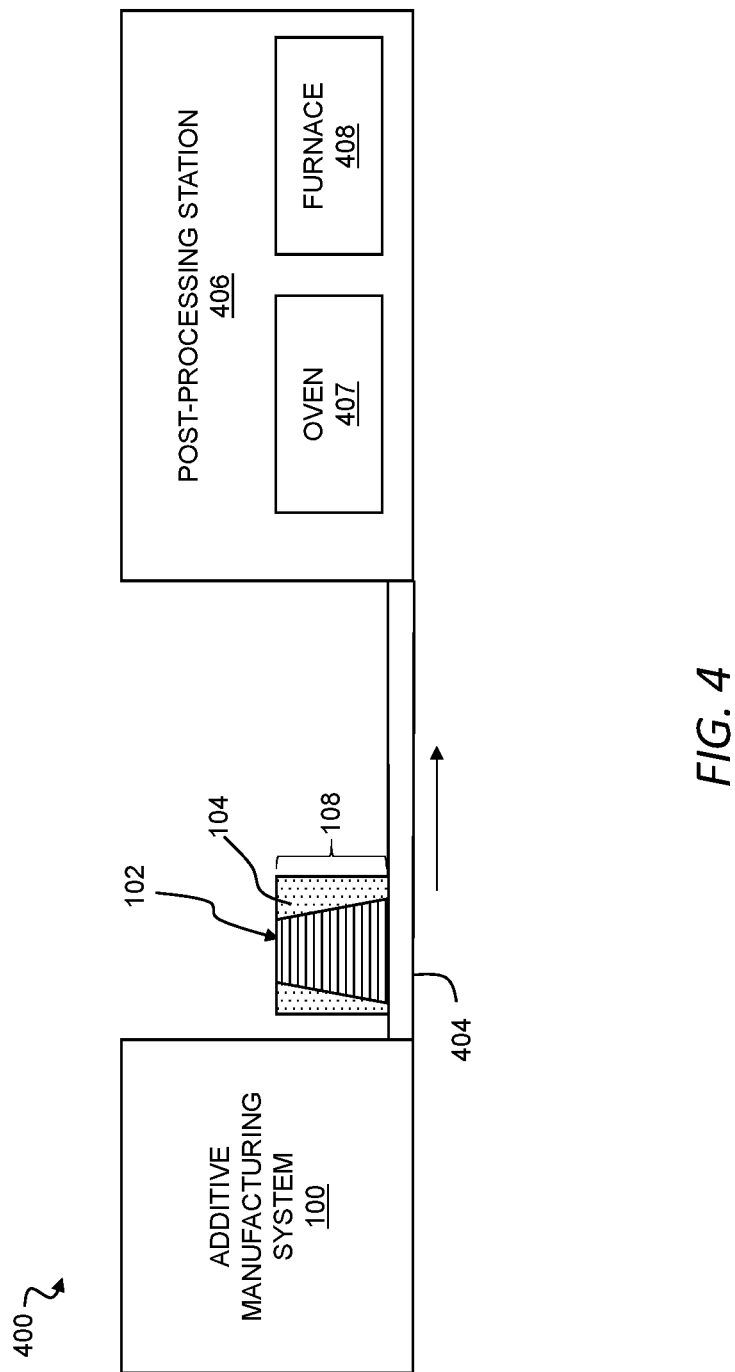
FIG. 4 is a schematic representation of an additive manufacturing plant including the additive manufacturing system of FIGS. 1A-1C.

FIG. 3 is a flowchart of an exemplary method of managing powder mobility in binder jet additive manufacturing using a vapor phase of a fluid. Unless otherwise specified or made clear from the context, the exemplary method 300 may be implemented using any one or more of the various different additive manufacturing systems, and components thereof, described herein. Thus, for example, the exemplary method 300 may be implemented as computer-readable instructions stored on the computer readable storage medium 132 (FIGS. 1A-1C) and executable by the one or more processors 131 (FIGS. 1A-1C) of the controller 130 (FIGS. 1A-1C) to operate the additive manufacturing system 100 (FIGS. 1A-1C).

As shown in step 302, the exemplary method 300 may include spreading a layer of a powder across a build volume at least partially defined by a print box. In general, the powder may have a mobility for particles of the powder within the print box as the layer of the powder is spread across the build volume. That is, to facilitate substantially uniform spreading of the powder, the particles of the powder may be relatively movable with respect to one another as the powder is initially put down and spread across the build volume. As described in greater detail below, once the powder has been spread in the form of the layer, the mobility of the powder may be advantageously reduced (e.g., such that the particles of the powder in the layer have increased cohesive strength) to reduce the likelihood of ejecta formation in response to impact force of a fluid, such as a binder or a component of a binder system, on the powder.

The powder may include any one or more of the powders described herein and, thus, may include one or more of metallic particles, ceramic particles, and polymeric particles. In instances in which the powder includes metallic particles, the metallic particles may include any one or more of various different metallic components useful for forming a finished part. As one of many examples, the metallic particles may include stainless steel particles, which may be particularly suitable for implementations in which the first fluid includes water. Further, or instead, the metallic particles may include one or more of carbon steel or tool steel types. Continuing with this example, to reduce the likelihood of corrosion of these metallic particles, the atmosphere in and around the build volume may be controlled to be oxygen-free (e.g., by using an inert gas, such as nitrogen). Continuing still further with this example, the first fluid may be selected to reduce the likelihood of corrosion of these metallic particles and, thus, for example, may include any one or more of deoxygenated water, one or more organic solvents, or one or more fluorocarbon liquids. It should be noted that many organic solvents have lower surface energies than water, which may be advantageous for achieving better wetting of particles on the powder but may result in lower cohesive forces between particles of the powder. As yet another example, the powder may include metallic particles that are alloyable with one another to form, for example, a metal having more desirable properties, such as greater strength and/or improved resistance to corrosion, as compared to one or both of the constituent components of the alloy.

The particles of the powder may have a predetermined size distribution, specified at least according to an average particle size (e.g., greater than about 0.5 microns and less than about 50 microns). In general, the predetermined size distribution may be based on considerations related to the depth of the layer being formed, flowability of the powder, subsequent processing (e.g., sintering), cost, or a combination thereof. Further, or instead, the predetermined size distribution may facilitate spreading the powder to achieve a suitable volume fraction of void space defined by the particles in the layer. For example, the volume fraction of void space in each layer may be greater than about 0.25 and less than about 0.75 in the layer. Within this range, the powder may be sufficiently penetrable by the first fluid while also being sufficiently packed such that capillary force of the liquid phase of the first fluid on the particles produces an appreciable reduction in the likelihood of particle ejection.

As shown in step 304, the exemplary method 300 may include directing a vapor phase of a first fluid to the layer of the powder. In general, directing the vapor phase of the first fluid may include forming the vapor phase of the first fluid in an evaporator (e.g., as the evaporator moves over the layer) and issuing the vapor phase of the first fluid from the evaporator toward the layer. Although formation and issuance of the vapor may be separately controlled in some instances, such separate control is not necessary in all implementations. Further, whether separately controlled or not, formation and issuance of the vapor may occur substantially simultaneously (e.g., with a delay of less than about 2 seconds).

Directing the vapor phase of the first fluid to the layer of the powder may include forming the vapor phase of the first fluid according to any one or more of the various different techniques described herein, unless a contrary intent is indicated or made clear from the context. Thus, for example, the vapor phase of the first fluid may be directed to the layer in combination with a carrier gas different from the first fluid (e.g., air, nitrogen, argon, or a combination thereof), as described above with respect to sparging. Additionally, or alternatively, the vapor phase of the first fluid may be directed to the layer by atomizing the first fluid and directing the atomized first fluid toward a hot surface to form the vapor phase, as described in greater detail below.

In general, the vapor phase of the first fluid may be directed to the layer of the powder according to any manner and form of issuing the vapor from an evaporator described herein. Thus, for example, the vapor phase of the first fluid may be issued from an outlet section defined by the evaporator as the outlet section is over the layer. As a more specific example, the evaporator and the layer may move relative to one another as the vapor phase of the first fluid issues from the outlet section to facilitate distributing the vapor phase of the first fluid along the x-y extent of the layer. The relative movement between the evaporator and the layer may be achieved through any one or more combinations of movement of the evaporator and/or the layer relative to one another. Thus, by way of example and not limitation, the vapor phase of the first fluid may issue from the outlet section of the evaporator moving over the layer as the layer remains stationary or moves.

As the vapor phase of the first fluid is directed to the layer, at least a portion of the vapor phase of the first fluid may persist until contact with the layer of the powder is achieved. That is, directing the vapor phase of the first fluid to the layer of the powder may, at least temporarily, alter an environment immediately above the layer of the powder and, in particular, increase a volumetric concentration of the vapor in the environment immediately above the layer of the powder. Thus, taking an example in which the first fluid is water, the environment immediately above the layer of the powder may have an initial humidity associated with an environment (e.g., in a build chamber) above the layer. Continuing with this example, directing the vapor phase of the first fluid to the layer of the powder may increase the humidity in the environment immediately above the layer of the powder as compared to the humidity in the same region prior to the introduction of the vapor phase of the first fluid. Further or instead, the increase in the volumetric concentration of the vapor may be achieved globally along the x-y extent of the layer or locally along portions of the x-y extent of the layer. For example, an outlet section of the evaporator may be a shroud sized to deliver the vapor phase of the first fluid along the entire x-y extent of the layer at the same time, without any scanning by the evaporator. That is, as a more specific example, the outlet section of the evaporator may be sized to be substantially the same size as the x-y extent of the layer such that the vapor phase of the first fluid issuing from the outlet section of the evaporator is directed to the entire x-y extent of the layer contemporaneously. As compared to one-dimensional or two-dimensional scanning methods, delivering the vapor phase of the first fluid to the entire x-y extent of the layer at the same time may offer advantages with respect to uniformity of the first fluid along the x-y extent of the layer.

In certain implementations, the vapor phase of the first fluid may be directed to the layer in a laminar flow. As used in this context, such a laminar flow includes flow of the vapor phase of the first fluid substantially devoid of eddies that may interfere with penetration of the vapor phase of the first fluid into the layer, where the vapor phase may condense to a liquid phase to decrease mobility of the particles of the powder in the layer. Further, or instead, as compared to highly turbulent flow, directing the vapor phase of the first fluid to the layer in a laminar flow may reduce the likelihood that the incidence of the vapor phase of the first fluid on the layer may itself create ejecta.

The first fluid may be, for example, any one or more of various different fluids that may be safely handled and generally compatible with other materials (e.g., the powder and a binder or component of a binder system) associated with the binder jetting process. For example, the first fluid may be non-flammable and vaporized over a temperature range compatible with the components of a system (e.g., the additive manufacturing system 100 in FIGS. 1A-1C) used to carry out the exemplary method 300. Additionally, or alternatively, the first fluid may be substantially inert at least with respect to the particles of the powder and/or a binder or a component of a binder system. For example, the first fluid may be introduced to the powder and removed from the powder without changing the chemical composition of the powder beyond a predetermined material specification. As an example of such an inert system, at least a portion of the powder may be non-oxidizing with respect to the first fluid (e.g., the first fluid may include water, and the powder may include stainless steel particles). Additionally, or alternatively, the first fluid may be substantially completely removable from the three-dimensional object via one or more of heating and drying the three-dimensional object (e.g., as part of post-processing described in greater detail below). Accordingly, examples of the first fluid include, but are not limited to, one or more of the following: water; acetone; toluene; methyl ethyl ketone; ethanol; isopropyl alcohol; and n-butyl acetate. Further, or instead, the first fluid may include one or more fluorocarbons.

While the first fluid may be substantially inert with respect to other materials used in binder jetting in certain instances, it should be appreciated that other combinations of materials may be used. That is, in certain instances, the first fluid may be chemically reactive with one or more other materials used in binder jetting. For example, in some cases, directing the vapor phase of the first fluid to particles of the powder may result in the use of only a small amount of the first fluid. In turn, the small amount of the first fluid may result in only a limited amount of chemical reaction taking place between the first fluid and other binder jetting materials. In many instances, such limited amounts of chemical reaction may be acceptable without impacting overall quality of the three-dimensional object being formed. As a specific example, in instances in which the first fluid is water, the first fluid may be compatible with one or more materials that would otherwise be corroded by water. Continuing with this example, because the one or more materials are exposed to a limited quantity of water and it is likely that this small amount of water evaporates as the build continues, there is a limited time in which the one or more materials are exposed to the water. The result, therefore, is a limited amount of corrosion. In certain instances, this limited amount of corrosion may not materially impact achieving target composition in a final part. For example, even if there is a limited amount of corrosion—as in the case of carbon steel powder—this corrosion may be reversed by reduction of the oxide to meal during a sintering operation. While limited chemical reactions may be characteristic of certain combination of materials, more substantial chemical reactions may be additionally or alternatively used to combine materials. As an example, the first fluid may advantageously react with a second fluid along the layer, as described in greater detail below.

While the first fluid may be compatible with other materials associated with the binder jetting process and with components of the additive manufacturing system used to carry out the process, it may nevertheless be useful to limit the amount of the vapor phase of the first fluid that moves beyond the build volume during layer-by-layer formation of the three-dimensional object. For example, between spreading successive layers of the plurality of layers, a flow of the vapor phase of the first fluid from the evaporator toward the layer may be interrupted such that the presence of the vapor phase of the first fluid beyond the x-y extent of the layer is limited. Such a limitation may, for example, reduce the amount of the first fluid required to carry out a particular binder jetting process. Further, or instead, interrupting the flow of the vapor phase of the first fluid in this way may reduce the likelihood of unintended liquid condensation in areas beyond the x-y extend of the layer.

As shown in step 306, the exemplary method 300 may include condensing the first fluid from the vapor phase to a liquid phase to reduce mobility of the particles of the powder. The condensation of the vapor of the first fluid on the layer of the powder may occur, for example, in the presence of a temperature differential between the vapor phase of the first fluid and at least a portion of the layer of the powder. That is, as the relatively hot vapor phase of the first fluid comes into contact with a relatively cool portion of the layer, the vapor phase of the first fluid may condense to the liquid phase. For the sake of clarity of explanation of certain principles, condensation of the vapor phase of the first fluid is generally described herein with respect to condensation in the overall layer. However, it should be understood that, as conditions vary over a layer, the degree of condensation may vary accordingly over the layer. Thus, unless otherwise indicated or made clear from the context, reference to condensation in the layer should be understood to refer to condensation in any given portion of the layer.

As an example, in instances in which the vapor phase of the first fluid is below the boiling point of the first fluid, the layer may be initially at a temperature below a saturation temperature of the vapor phase in a gaseous environment immediately above the respective portion of the layer. As the vapor phase of the first fluid contacts the layer, the vapor phase of the first fluid may condense as it is cooled below the saturation temperature. The saturation temperature of the vapor phase of the first fluid in a gaseous environment may be referred to herein as the "dew point." As used in this context, the dew point shall be understood to characterize condensation in water-air systems, as well as condensation in any other systems described herein. Additionally, or alternatively, as described in greater detail below, the vapor phase of the first fluid may be above the boiling point of the first fluid in certain instances, and contact between the vapor phase of the first fluid and the layer cools the vapor phase of the first fluid to a temperature below the boiling temperature such that the first fluid condenses to a liquid phase.

As may be appreciated from the foregoing examples, the condensation that occurs through the temperature differential between the layer and the vapor phase of the first fluid may be a substantially open loop process in some cases. That is, certain parameters of the temperature differential may be initially set and the change in the temperature differential may act to control condensation without separate feedback or intervention during fabrication of a given three-dimensional object. More specifically, parameters associated with the vapor phase at the upper end of the temperature differential may be set and monitored based at least in part on safety considerations. Additionally, or alternatively, the initial temperature of the layer of the powder at the lower end of the temperature differential may be controlled (e.g., through the use of heat—such as infrared heat—directed at the powder, directing a cool gas over the layer, or a combination thereof) to a target temperature to facilitate consistent condensation of the vapor throughout the layer-by-layer fabrication process. In some implementations, however, the environment of the powder prior to spreading may be stable (e.g., about 25° C.) throughout fabrication such that consistency in condensation—both in terms of spatial distribution along a single layer and layer-to-layer distribution—is achievable without separate control of the initial temperature of the powder in the layer.

While condensing the vapor phase of the first fluid may be carried out using open loop control in some instances, certain parameters associated with condensation of the vapor phase of the first fluid are measurable and, thus, may be suitable for implementation as aspects of closed loop control strategies. As an example, measuring a temperature rise of a powder in a build volume may be a useful as a proxy for determining at least a relative amount of condensation of the vapor phase of the first fluid in a given layer. That is, under otherwise nominally identical conditions, a larger temperature rise of the powder in the build volume may be indicative of a higher volume of the first fluid being condensed in a given layer. Thus, under certain control strategies, the temperature rise of the powder in the build volume may be controlled such that layer to layer variation in temperature rise of the powder in the build volume is within a target range. For example, the temperature rise of the powder in the build volume may be used as a feedback parameter to control temperature of the vapor phase of the first fluid being directed toward the layer.

In implementations in which the desired amount of the first fluid condensed in powder of the build volume is relatively small, the associated temperature rise of the powder in the build volume may be correspondingly small. As an example, if the amount of the first fluid condensed accounts for approximately 1% of the void space of stainless steel powder in the build volume, the temperature rise of the powder in the build volume due to condensation of the vapor phase of the first fluid may be as little as 5° C. This observation may form the basis of a useful control approach in which the temperature control requirements associated with the powder in the build volume are relaxed, or even eliminated. That is, under conditions corresponding to only a small temperature rise of the powder in the build volume, the process of condensing the vapor phase of the first fluid may be robust without closed loop control.

The condensing vapor phase may penetrate void space defined between the particles of the powder to deliver the first fluid to necks formed by the particles, as described above with respect to FIGS. 1A and 1B. With adequate penetration into the void space, condensing the first fluid from the vapor phase to the liquid phase along each layer may increase cohesive force holding the particles of the powder together in the respective layer, as compared to cohesive forces holding the particles of the powder together in the respective layer prior to condensation of the first fluid along the respective layer. In particular, it has been observed that such an increase in cohesive force may be achieved with only a small amount of the liquid phase of the first fluid in void spaces defined by the particles (e.g., the liquid phase of the first fluid in greater than about 0.1 percent of the void space and less than about 10 percent of the void space). As discussed above, this is significant at least because it facilitates reducing mobility of the particles of the powder (e.g., to reduce the likelihood of ejection of the particles) without significantly increasing the likelihood of bleeding of a binder or a component of a binder system.

As shown in step 308, the exemplary method 300 may include delivering a second fluid to the layer along a controlled two-dimensional pattern associated with a portion of the three-dimensional object to be formed within the layer. In general, at least the second fluid (and, in some cases, at least a portion of the first fluid in the layer) may operate to bind at least some of the powder in the layer. Thus, for example, the second fluid may include a binder or at least one component of a binder system useful for holding the particles of the powder together, such as any binder or component of a binder system known in the art. As a more specific example, to facilitate delivery of the second fluid, the second fluid may include a liquid medium (e.g., a solvent), and at least one component of the binder system dispersed (e.g., dissolved) in the liquid medium. Additionally, or alternatively, the second fluid may include one or more materials (e.g., polymeric materials) curable in the build volume prior to removing the three-dimensional object from the build volume.

In certain implementations, the step 306 of condensing the vapor phase of the first fluid on the layer may precede the step 308 of delivering the second fluid to the layer such that the second fluid is delivered onto the layer including the condensed vapor. For example, the second fluid may be delivered (e.g., jetted) to the layer from a printhead trailing movement of the evaporator over the build volume as the vapor phase of the first fluid is directed toward the layer on top of the build volume. As described above, this order of application of the first fluid and the second fluid may be particularly useful, as the reduction in mobility imparted to the layer by the liquid phase of the first fluid in the layer may reduce the likelihood that impact of the second fluid on the layer may inadvertently eject particles of the powder. In turn, such a reduction in ejected particles may reduce the likelihood of clogging or otherwise degrading the printhead used to deliver the second fluid. Because clogging of the printhead may impact accuracy of jetting the second fluid along a controlled two-dimensional pattern in a given layer, the reduction in clogging achievable through the presence of the liquid phase of the first fluid in the layer may improve the quality (e.g., dimensional accuracy) of the three-dimensional object being formed and, in turn, may improve the quality of the final part formed from the three-dimensional object.

In general, the first fluid may be condensed from the vapor phase to the liquid phase at least within the controlled two-dimensional pattern associated with delivery of the second fluid along the given layer. Thus, for example, the first fluid may be condensed from the vapor phase to the liquid phase along substantially the entire x-y extent of the layer while the two-dimensional pattern of the second fluid spans less than the entirety of the x-y extent of the layer. In view of such overlapping, the first fluid and the second fluid may advantageously be compatible with one another in the layer and, in some cases, may cooperate with one another in the layer in any of a variety of ways useful for improving the binder jetting process. As an example, the liquid phase of the first fluid may be soluble in the second fluid to facilitate delivering the second fluid to necks formed by the particles. That is, given that the first fluid may be at the necks prior to delivery of the second fluid, solubility of the first fluid and the second fluid may be useful for facilitating movement of the second fluid to the necks.

In some instances, the first fluid may be useful in reducing the likelihood of beading of the second fluid along the top of the layer. That is, in some instances, the second fluid may be delivered to a layer, where surface tension of the second fluid may cause the second fluid to draw toward itself. As the second fluid in the layer is drawn toward itself in this way, beads may form on top of the layer. These beads are a mixture of the second fluid and particles of the powder and can be relatively large compared to the depth of the layer (e.g., 200 micron beads may form on a layer having a 50 micron depth) such that the presence of these beads may significantly interfere with formation of one or more subsequent layers. Ultimately, this may degrade the dimensional accuracy or other properties (e.g., strength, density) of the three-dimensional object being formed. In certain instances, the first fluid may reduce mobility of the particles of the powder such that surface tension of the second fluid may be less likely to draw the particles of the powder into the formation of beads. In addition, or in the alternative, the first fluid may modify one or more characteristics of the second fluid to reduce the likelihood of bead formation. As an example, the first fluid may have a larger surface tension than the second fluid and, where the first fluid and the second fluid overlap along the layer, the larger surface tension of the first fluid may resist beading.

In some instances, at least one component of the first fluid may be the same as at least one component of the second fluid. As a particular example, the first fluid and the second fluid may each be water-based fluids and, thus, may have similar handling requirements (e.g. storage temperatures) and/or may respond similarly to post-processing conditions. Thus, in general, as compared to requirements for handling disparate materials, such commonality of components may reduce complexity of carrying out the exemplary method 300.

In certain instances, at least one component of the first fluid in the liquid phase may be the same as at least one component of the second fluid.

As shown in step 310, the exemplary method 300 may, optionally, include delivering a third fluid along at least a portion of the controlled two-dimensional pattern of the second fluid in the layer. The third fluid may be jetted, for example, from any one or more of the printheads described herein (e.g., printhead 114 in FIGS. 1A-1C). Thus, for example, the third fluid may be delivered from a separate instance of the printhead used to deliver the second fluid. Further, or instead, the third fluid may be delivered from the same printhead used to deliver the second fluid, such as in cases in which the printhead is a multi-material printhead.

The third fluid may be, for example, a suspension including an anti-sintering agent. As used herein, an anti-sintering agent shall be understood to include a material that is less sinterable than at least a portion of the particles of the powder. By way of example, the anti-sintering agent may be used to introduce certain structural characteristics into the final part. Such structural characteristics may include an area of weakness useful for separating portions of the final part from one another.

As shown in step 312, the exemplary method 300 may include repeating any one or more of the steps of the exemplary method 300 for each layer of a plurality of layers such that at least the second fluid (and, in some cases, at least a portion of the first fluid) operates to bind at least some of the powder in the plurality of layers to define a three-dimensional object in the build volume. In certain implementations, each step may be repeated for each layer of a plurality of layers forming the three-dimensional object. In some implementations, certain steps may be performed selectively in the plurality of layers forming the three-dimensional object. As an example, the steps of directing the vapor phase of the first fluid and condensing the vapor phase of the first fluid may be skipped for certain layers. As a more specific example, these steps may be skipped at regular intervals (e.g., one layer in every 100 layers) during fabrication of the three-dimensional object. Further, or instead, more than one layer may be skipped at a time. More generally, any intermittent use of directing the vapor phase of the first fluid and condensing the vapor phase of the first fluid should be understood to fall within the scope of the present disclosure. Further, or instead, the step of delivering the second fluid to the layer may be skipped for certain layers to form separation between multiple three-dimensional objects in instances in which multiple three-dimensional objects are formed as part of a single build.

Having described the exemplary method 300, attention is now turned to a specific example set forth for the purpose of further explanation only. Nothing in this example shall be construed as a limitation on the overall scope of this disclosure. In this example, the x-y extent of the build volume is 330 mm×330 mm, and the powder is gas-atomized 17-4 PH stainless steel powder with a particle size distribution characterized by a D10 of 6 microns, a D50 of 13 microns, and a D90 of 22 microns. Each layer spread across the build volume has a nominal thickness of 65 microns. When spread, the packing density of the powder in the layer is 58 percent. Thus, the void space constitutes 42 percent of the volume of the as-spread layer. The first fluid is water, and the second fluid is a polymer dissolved in a water-based material. The evaporator forms a vapor phase of the first fluid based on atomization, as described in greater detail below. The traverse rate of the evaporator over the build volume is 0.5 m/s. During the traverse, the flow rate of water into the evaporator is 5 cc/minute. The distribution gas flowing into the evaporator is nitrogen flowing at 25 liters/minute. Upon evaporation, the water expands by almost a factor of about 2000 and, thus, the volumetric flow rate of the water vapor is approximately 10 liters/minute. This water vapor mixes with the nitrogen flowing at 25 liters/minute and issues from the outlet of the evaporator through a slot having a width of 2 mm. In this example, if all of the water issuing from the outlet of the evaporator condenses within a newly spread layer, the condensed water will fill approximately 1.9 percent of the void space. Given that some of the water vapor may flow over the build volume and condense elsewhere, the condensed water in the newly spread layer will be greater than 0 and less than about 1.9 percent under these conditions. Thus, as may be appreciated from this example, a reduction in mobility of the powder in a given layer may be achieved with only a small amount of fluid in the void space defined by particles of the powder forming the layer.

Referring now to FIGS. 1A-1D and 4, an additive manufacturing plant 400 may include the additive manufacturing system 100, a conveyor 404, and a post-processing station 406. The print box 108 containing the three-dimensional object 102 may be moved along the conveyor 404 and into the post-processing station 406. The conveyor 404 may be, for example, a belt conveyor movable in a direction from the additive manufacturing system 100 toward the post-processing station. Additionally, or alternatively, the conveyor 404 may include a cart on which the print box 108 is mounted and, in certain instances, the print box 108 may be moved from the additive manufacturing system 100 to the post-processing station 406 through movement of the cart (e.g., through the use of actuators to move the cart along rails or by an operator pushing the cart).

The post-processing station 406 may include an oven 407. In use, the print box 108 may be moved into the oven 407, and heat may be directed into the build volume 116. For example, the heat directed into the build volume 116 may evaporate at least some of the liquid phase of the first fluid 120 from the build volume 116. To achieve practical drying times, it should be appreciated that a small amount of the liquid phase of the first fluid 120 may remain in the build volume 116 following a drying cycle. In this context, a small amount of the liquid phase of the first fluid 120 should be understood to be an amount that does not interfere with subsequent steps carried out in the post-processing station.

In certain instances, the three-dimensional object 102 may be heated in the oven 407 to a temperature sufficient to cure at least the second fluid 122 defining the three-dimensional object 102. Such curing of the second fluid 122 may further bind the particles 103 of the powder 104 to impart further rigidity to the three-dimensional object 102 in the build volume 116. Once this additional rigidity is achieved in the three-dimensional object 102, the unbound portion of the powder 104 may be separated from the three-dimensional object 102 through any one or more of various depowdering steps. In general, the heating cycle of the oven 407 may be a function of the composition of the first fluid 120 and the second fluid 122. That is, in some cases, the oven 407 may be heated to a temperature suitable for removing the first fluid 120, and then heated to a higher temperature suitable for curing the second fluid 122. Alternatively, the first fluid 120 may be removed from the three-dimensional object 102 through heating in an environment suitable for curing the second fluid 122.

In the post-processing station 406, the three-dimensional object 102 may be removed from the print box 108. The powder 104 remaining in the print box 108 upon removal of the three-dimensional object 102 may be, for example, recycled for use in subsequent fabrication of additional parts. Additionally, or alternatively, in the post-processing station 406, the three-dimensional object 102 may be cleaned (e.g., through the use of pressurized air) of excess amounts of the powder 104.

The three-dimensional object 102 may undergo one or more debinding processes in the post-processing station 406 to remove all or a portion of the binder system from the three-dimensional object 102. In general, it shall be understood that the nature of the one or more debinding processes may include any one or more debinding processes known in the art and is a function of the constituent components of the binder system. Thus, as appropriate for a given binder system, the one or more debinding processes may include a thermal debinding process, a supercritical fluid debinding process, a catalytic debinding process, a solvent debinding process, and combinations thereof. For example, a plurality of debinding processes may be staged to remove components of the binder system from the three-dimensional object 102 separately.

In certain instances, the post-processing station 406 may include a furnace 408. The three-dimensional object 102 may undergo sintering in the furnace 408 such that the particles 103 of the powder 104 combine with one another through one or more of solid state or liquid state sintering processes to form a finished part. Additionally, or alternatively, one or more debinding processes may be performed in the furnace 408 as the three-dimensional object 102 undergoes sintering. Further or instead, one or more debinding processes may be performed outside of the furnace 408 or in a different instance of the furnace 408 in which sintering takes place.

While certain implementations have been described, other implementations are additionally or alternatively possible.

For example, while the vapor has been described as being formed through the use of sparging and, more generally, through techniques associated with forming a vapor phase of the first fluid below a boiling point of the first fluid, other techniques for forming the vapor phase of the first fluid are additionally or alternatively possible.

For example, referring now to FIGS. 1A-1D and 5A, an evaporator 500 may form a vapor phase of the first fluid 120 based on atomizing the first fluid 120 to form small droplets and heating the small droplets in the in the evaporator 500 to a temperature at or above the boiling point of the first fluid 120, as described in greater detail below. As compared to forming a vapor phase of the first fluid 120 through sparging, forming the vapor phase of the first fluid 120 through a combination of atomization and heating may reduce the need to carry a reservoir of fluid across the build volume 116 and, more generally, may be implemented in a smaller size envelope. Unless otherwise specified or made clear from the context, the evaporator 500 may be used in the additive manufacturing system 100 to form the vapor phase of the first fluid 120 and, thus, may be used to carry out various different aspects of the exemplary method 300 (FIG. 3).

The evaporator 500 may include an atomizer 502, a heater 503, and a housing 504. The housing 504 may define an inlet section 506 and an outlet section 508 in fluid communication with one another along a flow path 510 defined therebetween. As described in greater detail below, the housing 504 may support the atomizer 502 and the heater 503 such that the atomizer 502 and the heater 503 may cooperate with one another to form a mixture of a vapor phase of the first fluid 120 in a distribution gas along the flow path 510. In use, the mixture of the of the vapor phase of the first fluid 120 and the distribution gas may issue from the outlet section 508 of the housing as the evaporator 500 moves over the layer 118 of the powder 104.

The atomizer 502 may include an inlet port 512 and an exit nozzle 514 in fluid communication with one another. In general, the atomizer 502 may receive a liquid phase of the first fluid 120 at the inlet port 512 from the liquid source 140. More specifically, the atomizer 502 may be in fluid communication with the liquid source 140 via the first flow controller 144. As indicated above, the first flow controller 144 may include a solenoid valve or other similar actuatable valve that may interrupt flow from the liquid source 140. Additionally, or alternatively, the first flow controller 144 may be actuatable to meter the flow of the liquid phase of the first fluid 120 into the inlet port 512 according to any one or more of various different liquid metering techniques. Thus, for example, the first flow controller 144 may, further or instead, include a metering pump. In use, the atomizer 502 may receive the metered flow of the liquid phase of the first fluid 120 and may form the liquid phase of the first fluid 120 into droplets 516 at the exit nozzle 514 through any one or more of various different known techniques for atomizing liquid. For example, the atomizer 502 may atomize the first fluid through one or more of ultrasonic atomization, hydraulic atomization, or gas atomization, including through nebulization.

The atomizer 502 may be supported, for example, along the inlet section 506 of the housing 504 with the inlet port 512 of the atomizer 502 generally accessible from outside of the flow path 510 to facilitate connection of the atomizer 502 in fluid communication with the liquid source 140 via the first flow controller 144. With the inlet port 512 so supported along the inlet section 506 of the housing 504, at least a portion of the exit nozzle 514 of the atomizer 502 may be disposed along the flow path 510. Thus, in use, the droplets 516 produced by the atomizer 502 may be expelled from the exit nozzle 514 and into the flow path 510. For example, the droplets 516 may be directed into the flow path 510 in a direction generally toward the outlet section 508 of the housing 504. Further, or instead, the exit nozzle 514 of the atomizer 502 may be mounted to the inlet section 506 of the housing 504 such that a spray pattern of the droplets 516 expelled from the exit nozzle 514 is directed to one or more heated surfaces of the housing 504 prior to exiting the outlet section 508. For example, to reduce the likelihood that the droplets 516 expelled from the exit nozzle 514 do not impinge on any hot surfaces of the housing 504, the flow path 510 may include one or more non-linear sections. More specifically, such non-linear sections may define a tortuous path in a direction from the inlet section 506 to the outlet section 508.

Figure 2:
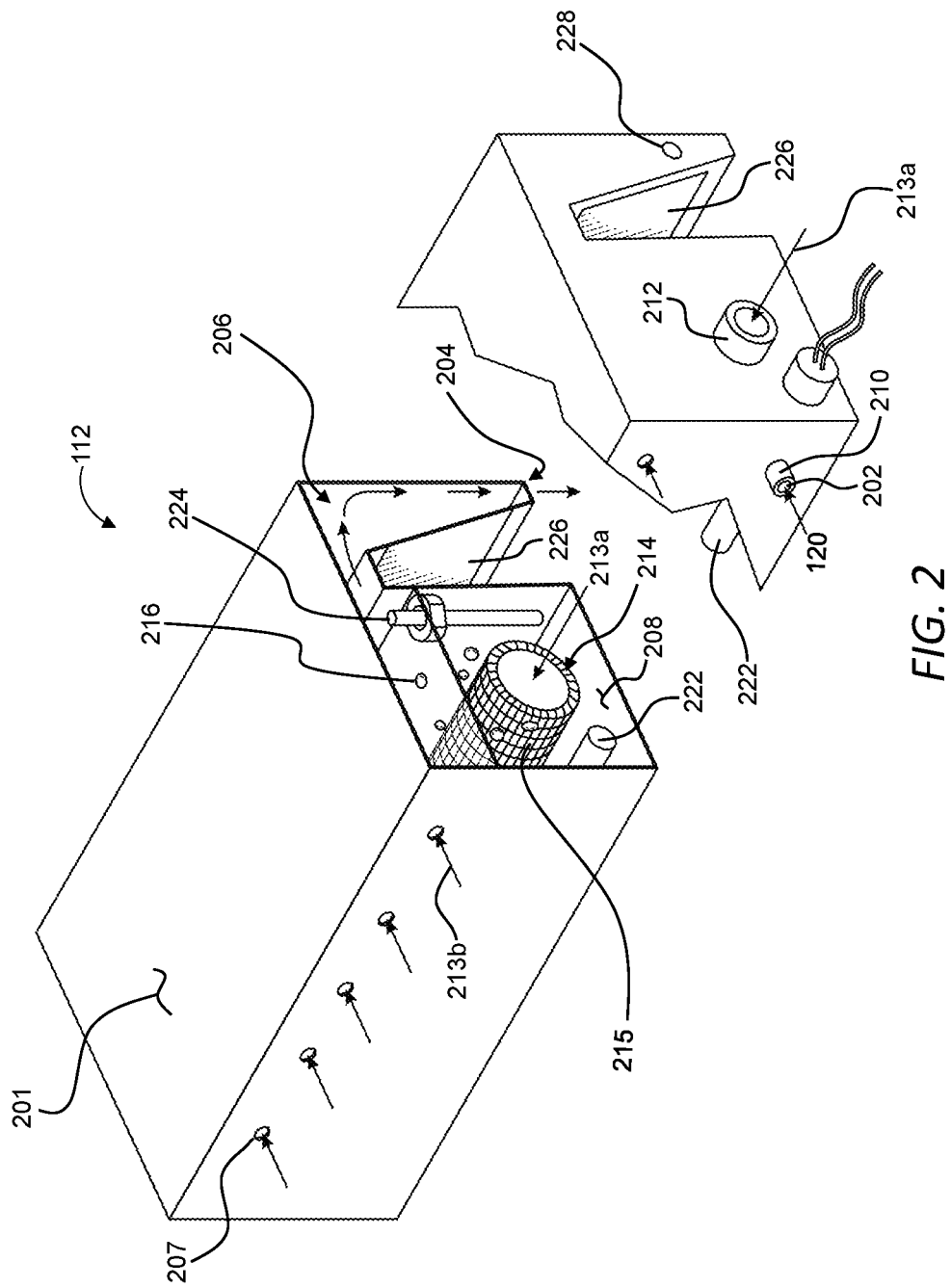
FIG. 2 is a schematic representation of an evaporator in operation, the evaporator including a sparger, the evaporator shown with a portion of the housing removed to show features within the housing.

In certain instances, the inlet section 506 of the housing 504 may include one or more gas inlets 518 for receiving a distribution gas 520. The distribution gas 520 may be any one or more of the various different distribution gases described herein and, unless otherwise indicated or made clear from the context, may be the same as the distribution gas 213b (FIG. 2). In general, the one or more gas inlets 518 may be connectable, such as through the use of a manifold or other similar arrangement, in fluid communication with a pressurized source of the distribution gas 520. As an example, the one or more gas inlets 518 may be connectable in fluid communication with the gas source 142 via the second flow controller 146, which may control flow of the distribution gas 520 into the housing 504. As the distribution gas 520 moves into the evaporator 500 through the gas inlets 518, the distribution gas 520 may mix with the droplets 516. In particular, the droplets 516 may be sufficiently small (e.g., having an average size of greater about 5 microns and less than about 100 microns) to form a suspension of the droplets 516 in the distribution gas 520. Such a suspension of the droplets 516 in the distribution gas 520, commonly referred to as a mist, may be useful for reducing the likelihood of unintended aggregation of the droplets 516 along the flow path 510. In turn, such a reduction in the likelihood of unintended aggregation may be useful for maintaining consistent conditions in the vapor phase of the first fluid 120 issuing from the outlet section 508 of the housing 504 during use.

The heater 503 may be in thermal communication with the flow path 510 to heat the mixture of the droplets 516 and the distribution gas 520 as the mixture moves along the flow path 510. More specifically, the heater 503 may heat at least a portion of the housing 504 along the flow path 510 to heat the mixture to a temperature at or above the boiling temperature of the first fluid 120. Through such heating, the droplets 516 carried by the distribution gas 520 may vaporize such that the mixture becomes a gaseous mixture prior to issuing from the outlet section 508 of the housing 504.

The heater 503 may be any one or more of various different types of heaters controllable to a target temperature at or above the boiling temperature of the first fluid 120 (e.g., through open loop control or through closed loop control based on an indication of temperature from the heater 503 itself and/or from a separately positioned temperature sensor (not shown)). Thus, for example, the heater 503 may include one or more pad resistance heaters. The heater 503 may be in thermal communication with the flow path 510 via, for example, one or more walls of the housing 504 (e.g., mounted on the outside of the housing 504) such that the heater 503 is not directly exposed to the mixture of fluids moving through the flow path 510. In general, such isolation of the heater 503 from direct exposure to the mixture of fluids may reduce the potential for degradation of the heater 503 over time. In instances in which heat from the heater 503 is conducted through the housing 504, the housing may be formed of a material having a high thermal conductivity (e.g., one or more metals) and sufficient thickness such that temperature along the flow path 510 is substantially uniform to promote, in turn, reliable and consistent vaporization of the first fluid 120 along the flow path 510.

In general, the outlet section 508 may be shaped and arranged to facilitate a substantially uniform distribution of the vapor phase of the first fluid 120 along an x-y extent of the layer 118. Thus, for example, the outlet section 508 may span at least one dimension of the build volume 116 (and thus the layer 118) as the evaporator 500 is moved over the build volume 116. Further, or instead, the outlet section 508 may be substantially perpendicular to the layer 118 of the powder as the evaporator moves over the build volume 116. In certain implementations, the outlet section 508 of the housing 504 may, further or instead, be in the shape of a converging nozzle in a direction defined from the inlet section 506 to the outlet section 508 of the housing 504 to reduce the likelihood of inducing eddy currents as the vapor phase of the first fluid 120 issues from the outlet section 508.

The outlet section 508 through which the vapor phase of the first fluid 120 is issued from the evaporator 500 may have a significantly greater open area than an open area of the inlet port 512 through which the liquid phase of the first fluid 120 is introduced into the evaporator 500. This difference in open area is at least partially attributable to differences in density between the liquid phase of the first fluid 120 and vapor phase of the first fluid 120. Thus, for example, the inlet port 512 may have a first open area, the outlet section 508 may have a second open area, and the ratio of the second open area to the first open area may be greater than about 10:1 and less than about 5,000:1 (e.g., about 1,000:1).

In certain implementations, the evaporator 500 may include a gate 522 movable to interrupt flow issuing from the outlet section 508 of the housing 504. In particular, the gate 522 may be in an open position to permit issuance of the vapor phase of the first fluid 120 toward the layer 118 as the evaporator 500 is above the build volume 116. Further, or instead, the gate 522 may be moved to a closed position to block the flow of the vapor phase of the first fluid 120 toward the layer 118 as the evaporator 500 is moved to a position lateral to the build volume 116. That is, the gate 522 may be actuated to close between formation of successive layers to reduce the likelihood of inadvertently delivering the vapor phase of the first fluid 120 to areas away from the layer 118. In addition to being a useful safety measure, such control over the vapor phase of the first fluid 120 may be useful for managing atmospheric control in the build chamber 115. In certain implementations, opening and closing the gate 522 may coincide with shutting off the flow of the distribution gas 520 and the first fluid 120 into the flow path 510.

The gate 522 may be generally oriented to open and close without interfering with the layer 118. For example, the gate 522 may be movable in a direction parallel to the x-y extent of the layer 118 such that the gate 522 may be movable within the standoff clearance between the outlet section 508 and the top of the layer 118. Additionally, or alternatively, the gate 522 may be positioned within the housing 504, along the flow path 510.

In certain instances, the residence time of the first fluid 120 along the flow path 206 may be based on the time required for the evaporator 500 to traverse the layer 118. For example, it may be useful to generate and dispense the vapor phase of the first fluid 120 during the time it takes for the evaporator 500 to traverse the layer 118. Doing so may reduce the likelihood that significant residual amounts of the first fluid 120 and/or the distribution gas 520 remain in the evaporator 500 in the brief shut-off periods between formation of successive layers. In turn, the gaseous mixture of the vapor phase of the first fluid 120 and the distribution gas 520 may be substantially uniform from layer to layer.

While evaporator 500 has been described as using the distribution gas 520 to form a mixture with the first fluid 120, it should be appreciated that the vapor phase of the first fluid 120 may be produced without the use of the distribution gas 520. For example, operation of the evaporator 500 without the distribution gas 520 may include introducing the first fluid 120 into the flow path 510 defined by the housing 504 (e.g., with or without atomization) and heating the first fluid 120 along the flow path 510 to a temperature at or above the boiling temperature of the first fluid 120 to form the vapor phase. Without a distribution gas in the flow path 510, expansion of the vapor phase of the first fluid 120 may drive the vapor phase of the first fluid 120 toward the outlet section 508. Thus, as compared to implementations in which a distribution gas is used, the outlet section 508 may be smaller to achieve a suitable exit velocity of the vapor phase of the first fluid 120 issuing from the outlet section 508. Elimination of the distribution gas 520 may have the advantage of reducing complexity of hardware. Further, or instead, elimination of the distribution gas 520 may facilitate delivering the vapor phase of the first fluid 120 toward the layer at lower velocities than may be achievable with the use of the distribution gas 520. Without wishing to bound by theory, through elimination or substantial reduction of the distribution gas 520, most of the fluid directed from the outlet section 508 to the layer 118 is the vapor phase of the first fluid 120. Again without wishing to be bound by theory, as the vapor phase of the first fluid 120 contacts the powder 104, the vapor phase of the first fluid 120 may condense and enter the void space 124 of the powder, thus making room for an additional amount of the vapor phase of the first fluid 120 to contact the powder 104 to condense and enter the void space 124 of the powder. Accordingly, it is believed that reduction or elimination of the distribution gas 520 may result in more of the vapor phase of the first fluid 120 condensing on and in the powder 104, with less of the vapor phase of the first fluid 120 spilling off of the x-y extent of the layer 118 and being lost to the environment of the build chamber 115.

While the use of a single atomized spray has been described with respect to vaporization, it should be appreciated that a plurality of atomized sprays may be used to facilitate, among other things, producing a large amount of a vapor phase of a fluid.

Figure 5A:
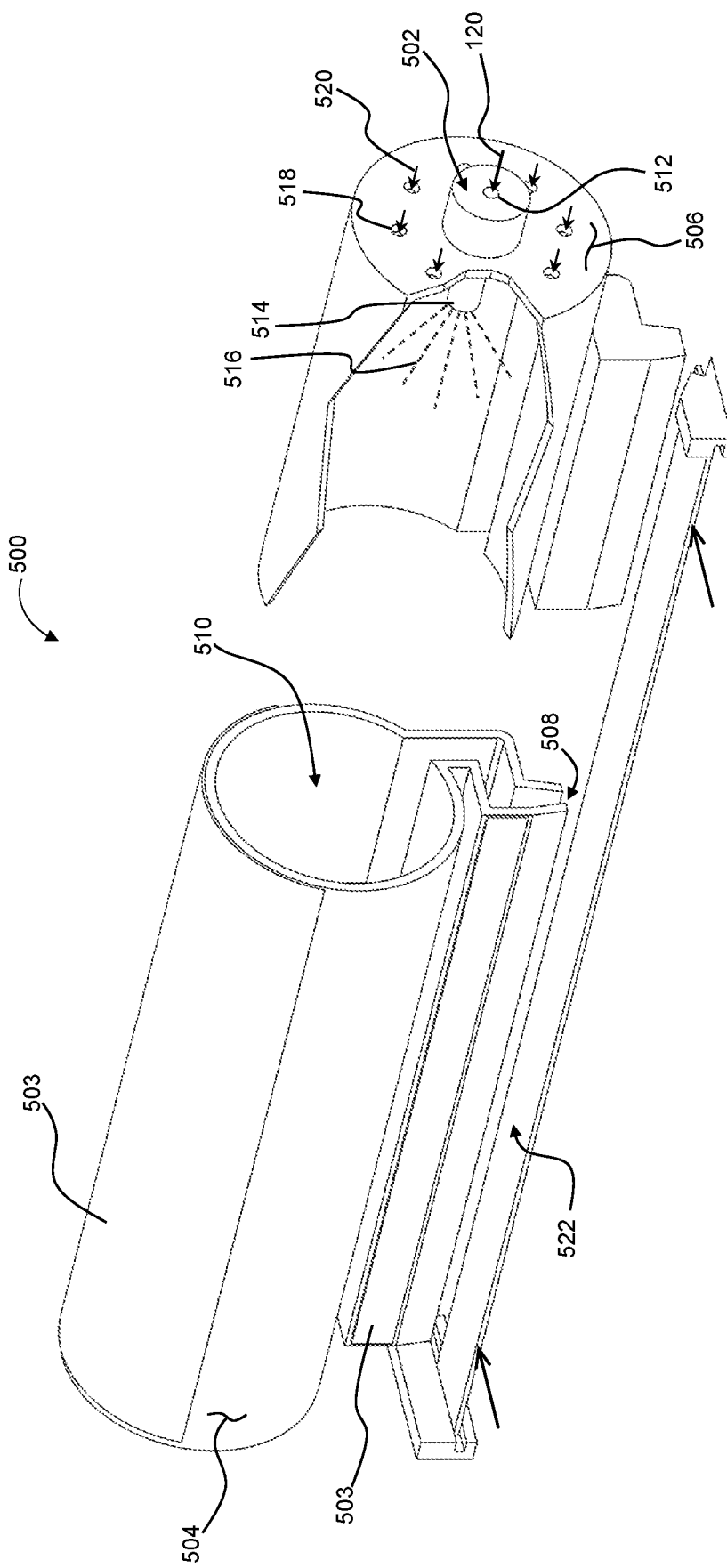
FIG. 5A is a schematic representation of an evaporator in operation, the evaporator including an atomizer, and the evaporator shown with a portion of a housing removed to show features within the housing.
Figure 5B:
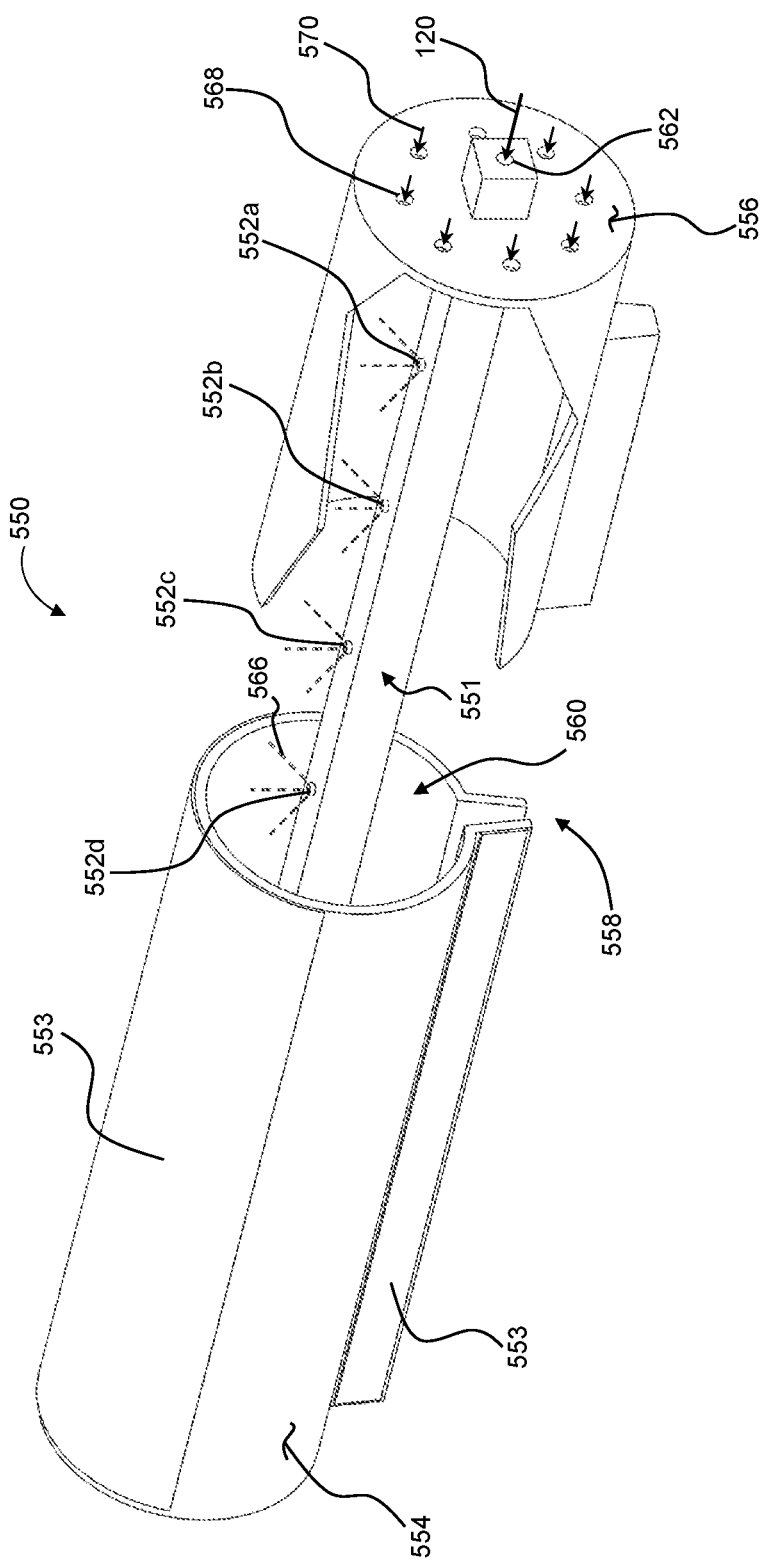
FIG. 5B is a schematic representation of an evaporator in operation, the evaporator including a plurality of exit nozzles, and the evaporator shown with a portion of a housing removed to show features within the housing.

For example, referring now to FIGS. 1A-1D and 5B, an evaporator 550 may include a rail 551 supporting a first exit nozzle 552a, a second exit nozzle 552b, a third exit nozzle 552c, and a fourth exit nozzle 552d (collectively referred to as the plurality of exit nozzles 552a-d). While the plurality of exit nozzles 552a-d is shown as including four exit nozzles, it should be readily appreciated that any number of exit nozzles may be supported on the rail 551. Further, unless otherwise specified or made clear from the context, components of the evaporator 550 should be understood to be analogous to similar components of the evaporator 500 (FIG. 5A). For the sake of economic description, these similar components are not described separately, except to note differences or to highlight certain aspects.

The evaporator 550 may also include a heater 553 and a housing 554, with the housing 554 defining an inlet section 556 and an outlet section 558 in fluid communication with one another along a flow path 560 defined therebetween. The housing 554 may define an inlet port 562 in fluid communication with the rail 551 such that a liquid form of the first fluid 120 (e.g., received from the liquid source 140 via the first flow controller 144) may flow along the rail 551 to the plurality of exit nozzles 552a-d. At the plurality of exit nozzles 552a-d, droplets 566 may be formed through any one or more of the various different atomization techniques described herein.

The heater 553 may be disposed along the housing 554 and, in general, should be understood to be analogous to the heater 503 (FIG. 5A). Thus, in use, the heater 553 may heat the housing 554 to a temperature above the boiling point of the first fluid 120. That is, as the droplets 566 from the plurality of exit nozzles 552*a-d* impinge on one or more surfaces of the housing 554, the droplets 566 may vaporize to form the vapor phase of the first fluid 120.

In certain implementations, the housing 554 may define one or more gas inlets 568 through which a distribution gas 570 may be introduced into the flow path 560 (e.g., from the gas source 142 via the second flow controller 146) to create certain flow characteristics in the flow path 560, as described with respect to any one or more of the distribution gases described herein. In some implementations, the distribution gas 570 may be omitted, such that the flow of the vapor phase of the first fluid 120 may issue from the outlet section 558 through expansion of the first fluid 120 as the first fluid 120 vaporizes.

While methods for managing powder mobility have been described with respect to a first fluid and a second fluid that do not substantially chemically react with one another in the build volume, other combinations of the first fluid and the second fluid are additionally or alternatively possible. For example, the first fluid and the second fluid may chemically react with one another to facilitate one or more of localizing the second fluid along a controlled two-dimensional pattern, forming binder or a component of a binder system, or some combination thereof.

Figure 6:
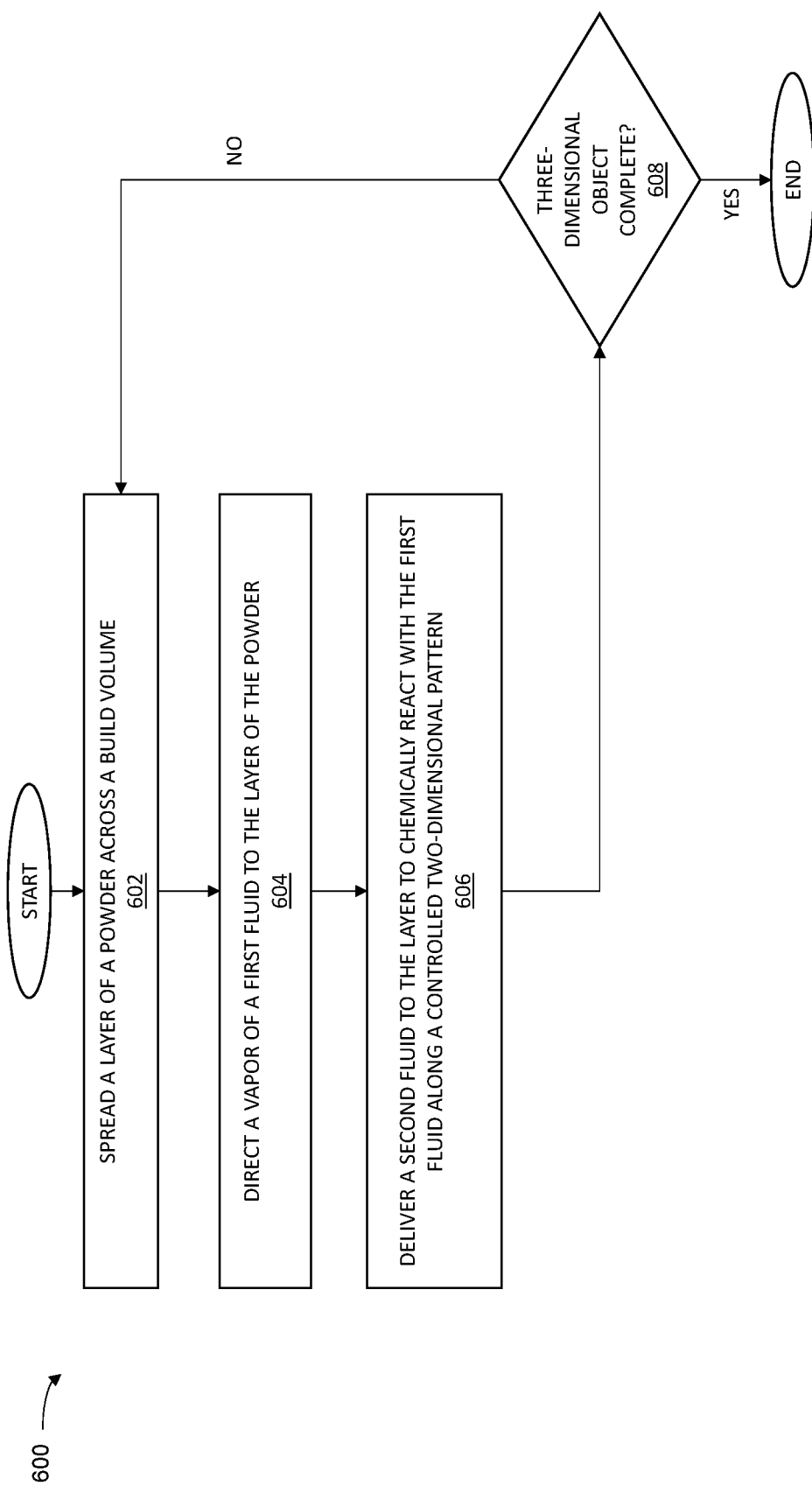
FIG. 6 is a flow chart of an exemplary method of a binder jet additive manufacturing method including in situ chemical reaction involving a first fluid directed in a vapor phase toward a layer and a second fluid delivered to the layer.

FIG. 6 is a flow chart of an exemplary method 600 of a binder jet additive manufacturing method including in situ (i.e., within build volume) chemical reaction of a first fluid directed in a vapor phase toward a layer with a second fluid delivered to the layer. Unless otherwise specified or made clear from the context, the exemplary method 600 may be implemented using any one or more of the various different additive manufacturing systems, and components thereof, described herein. Thus, for example, the exemplary method 600 may be implemented as computer-readable instructions stored on the computer readable storage medium 132 (FIGS. 1A-1C) and executable by the one or more processors 131 (FIGS. 1A-1C) of the controller 130 (FIGS. 1A-1C) to operate the additive manufacturing system 100 (FIGS. 1A-1C).

As shown in step 602, the exemplary method 600 may include spreading a layer of a powder across a build volume at least partially defined by a print box. In general, spreading the layer in step 602 shall be understood to be analogous to step 302 described above with respect to the exemplary method 300 (FIG. 3). Thus, for example, spreading the layer in step 602 shall be understood to include spreading any one or more of the various different types of powders described herein to form a substantially uniform layer of the powder across the top of the build volume.

As shown in step 604, the exemplary method 600 may include directing a first fluid in a vapor phase toward the layer of the powder. In general, directing the first fluid in the vapor phase in step 604 shall be understood to be analogous to step 304 described above with respect to the exemplary method 300 (FIG. 3). Thus, for example, directing the first fluid in the vapor phase in step 604 shall be understood to include introducing the vapor phase of the first fluid to a layer of the powder that is cooler than the vapor phase of the first fluid. This temperature differential between the vapor phase of the first fluid and the layer of the powder may drive penetration of the vapor phase of the first fluid into the layer as the vapor phase of the first fluid condenses. That is, unless otherwise specified or made clear from the context, directing the first fluid in the vapor phase in step 604 shall be understood to result in a distribution of a substantial portion of the liquid phase of the first fluid along necks defined by particles of the powder (as described above with respect to FIG. 1D).

As shown in step 606, the exemplary method 600 may include delivering a second fluid along the layer in a controlled two-dimensional pattern associated with the layer. In general, at least one component of the second fluid delivered to the layer may chemically react with the first fluid along the controlled two-dimensional pattern associated with the layer. As an example, the first fluid may increase one or more of a degree of crosslinking or a degree of polymerization of the at least one component of the second fluid (e.g., one or more of cyanoacrylate, silane, a silane-grafted polymer, or a moisture curable polyurethane) along the controlled two-dimensional pattern associated with the layer. As an additional or alternative example, the first fluid may include one or more components that change a pH level of the at least one component of the second fluid along the controlled two-dimensional pattern associated with the layer. In particular, the first fluid may include one or more of nitric acid, hydrogen chloride, ammonia, or carbon dioxide, as these materials are commonly available and have well-understood handling requirements. Continuing with this example, one or more of these materials may be dissolved in a solvent, such as water. More generally, however, while certain examples of chemical reactions are described below, the chemical reaction of the at least one component of the second fluid with the first fluid should be understood to include any change in the molecular or ionic structure of one or both of the first fluid or the second fluid along the controlled two-dimensional pattern. Further, or instead, the chemical reaction between the first fluid and the at least one component of the second fluid may be at least initiated, and in some cases may be completed, before a subsequent layer is formed on top of the layer.

The second fluid may include, for example, a liquid medium in which at least one component of the second fluid is dispersed. The liquid medium may be, for example, different from the first fluid to facilitate maintaining the at least one component of the second fluid in a stable form until the at least one component of the second fluid is chemically reacted with the first fluid in the layer. As an example, the first fluid may be water, the at least one component of the second fluid may be chemically reactable with the first fluid, and the liquid medium of the second fluid may be anhydrous (e.g., an anhydrous solvent in which the at least one component of the second fluid is dissolved) such that the at least one component of the second fluid remains stable in the carrier liquid. As a specific example, the at least one component of the second fluid may be a cyanoacrylate and the anhydrous solvent may be one or more ketones (e.g., acetone, butanone, cyclohexanone) or one or more esters (e.g., ethyl acetate or butyl acetate). As yet another specific example, the at least one component of the second fluid may be a silane or a silane-grafted polymer, and the anhydrous solvent may be methanol or ethanol. As still another specific example, the at least one component of the second fluid may be polyurethane and the anhydrous solvent may be any one or more of various different urethane-grade solvents, such as Eastman™ Butyl Acetate, available from Eastman Chemical Company of Kingsport, Tenn.

In some implementations, the chemical reaction of the first fluid and the second fluid may increase localization of the second fluid along the respective layer as compared to localization of the second fluid along the given layer prior to chemical reaction of the first fluid and the at least one component of the second fluid. Such localization may, for example, make the second fluid less likely to flow in the layer, thus reducing the likelihood that the second fluid will bleed to distort the controlled two-dimensional pattern. In general, such a change in the flow characteristics of the second fluid may correspond to a change in viscosity of the second fluid, such as may be achieved through chemical reaction of the first fluid and the at least one component of the second fluid to form a gel or a sol. As a more specific example, the at least one component of the second fluid may include colloidal silica, and the first fluid may change the pH level of the colloidal silica to form a silica gel. In instances in which the at least one component of the second fluid includes an alkaline stabilized colloidal silica, the first fluid may have an acidic character. In instances in which the at least one component of the second fluid is an acid stabilized colloidal silica, the first fluid may have a basic character.

In certain implementations, the chemical reaction of the first fluid and the at least one component of the second fluid may form at least one component of a binder along the controlled two-dimensional pattern associated with the layer. As an example, chemical reaction of the first fluid and the at least one component of the second fluid may be used to form polyacrylic acid in situ in the layer. For example, the at least one component of the second fluid may include pre-crosslinked unneutralized polyacrylic acid. Continuing with this example, the chemical reaction of the first fluid and the at least one component of the second fluid may increase the pH level of the pre-crosslinked unneutralized polyacrylic acid. In general, such in situ formation of at least one component of the binder may be particularly advantageous in instances in which the at least one component of the binder is challenging to deliver. That is, in some cases, the properties that make a material particularly well suited for binding particles may correspond to a tendency of that same material to clog hardware. Thus, in some cases, the in situ formation of the at least one component of the binder from the first fluid and the second may reduce the likelihood of clogging hardware.

Additionally, or alternatively, the chemical reaction of the first fluid and the at least one component of the second fluid may form an anti-sintering agent along the controlled two-dimensional pattern associated with the layer. For example, the anti-sintering agent may be formed in an area along which preferential fracturing may be desired (e.g., to separate multiple instances of a part being fabricated at the same time). While the anti-sintering agent may be formed through any one or more of various different chemical reactions of the first fluid and the at least one component of the second fluid, the chemical reaction of the first fluid and the at least one component of the second fluid may form the anti-sintering agent through flocculation (e.g., due to a pH change in a stable suspension of the anti-sintering agent) in some implementations. As an example, the at least one component of the second fluid may include a pH stabilized suspension of $TiO_2$ particles that may be caused to flocculate by the first fluid. Further, or instead, the chemical reaction of the first fluid and the at least one component of the second fluid may form the anti-sintering agent through precipitation. As an example, the first fluid may include a base (e.g., ammonia) having a pH level above 7, and the at least one component of the second fluid may include acid solubilized aluminum hydroxide. In this example, the chemical reaction of the base and the acid solubilized aluminum hydroxide may precipitate aluminum hydroxide.

In some implementations, the composition of the first fluid may change between the liquid phase in which it is delivered to the evaporator and the liquid phase after condensation in the layer. As an example, consider the case in which it is desirable for the condensed liquid phase of the first fluid in the layer to be water-based but slightly basic. As a more specific example, it may be desirable for the condensed liquid phase of the first fluid in the layer to include water with some amount of ammonia dissolved in it. However, in instances in which the evaporator functions by atomizing the first fluid and impinging the resulting droplets on surfaces above the boiling point of the first fluid, providing the first fluid with some amount of ammonia dissolved therein is likely to result in the ammonia coming out of solution upon evaporation and turning into ammonia gas. Some, but perhaps not all, of this ammonia gas may then re-dissolve in the condensed liquid within the layer. The result, therefore, is that the composition of the liquid phase of the first fluid within the layer may differ from the composition of the liquid phase of the first fluid provided to the evaporator.

Alternatively, or in addition, the composition of the liquid phase of the first fluid condensed in the layer may be influenced by the nature and composition of the distribution gas. Continuing with the example of ammonia above, the amount of ammonia dissolved in water in the layer may be increased by using a distribution gas having a partial concentration of ammonia. Thus, stated differently, the distribution gas may be used to increase the ammonia concentration in the first fluid condensed in the layer to achieve a concentration suitable, for example, for carrying out a chemical reaction including the second fluid. As an additional or alternative example, a combination of the first fluid and the distribution gas may be used to form slightly acidic water. That is, pure water may be provided to the evaporator as the first fluid and the distribution may include carbon dioxide (e.g., carbon dioxide alone or in a mixture with an inert gas). As this mixture is directed to the layer, the water may condense in the layer and the carbon dioxide may dissolve into this condensed water to create carbonic acid and lower pH of the condensed water.

In some implementations, the vapor phase of the first fluid may be directed to the layer before the second fluid is delivered to the layer to form the controlled two-dimensional pattern in the layer. In such instances, the first fluid may be concentrated at necks formed by particles of the powder of the layer (e.g., as described with respect to FIG. 1D), thus reducing mobility of the particles of the powder of the layer. Continuing with this example, the chemical reaction between the first fluid and the second fluid may take place at least at areas of contact between the particles. For example, chemical reaction of the first fluid and the second fluid in the vicinity of the necks of the particles may form a third material at the necks. This third material may, for example, impart improved cohesive strength at the necks of the particles.

As shown in step 608, the exemplary method 600 may include, for a plurality of layers, repeating the steps of spreading a respective layer of the powder, directing the first fluid in the in the vapor phase to the respective layer, and delivering the second fluid along the respective layer such that at least the second fluid (and, in some cases, at least some of the first fluid) operates to bind a portion of the powder in the plurality of layers to form a three-dimensional object in the build 206

While the vapor phase of a fluid has been described as being delivered to a layer from an evaporator moving over the layer, it should be appreciated that the vapor phase of a fluid may, further or instead, be introduced into the layer through controlling an environment in a build chamber (e.g., the build chamber 115 in FIGS. 1A-1C). As compared to the use of an evaporator, controlling the environment of the build chamber may require moving fewer components across the build volume. Further, or instead, as compared to delivering the vapor phase of the first fluid from an evaporator, controlling the environment of the build chamber to introduce vapor into the layer may facilitate achieving more uniform condensation of the first fluid across the layer.

Figure 7:
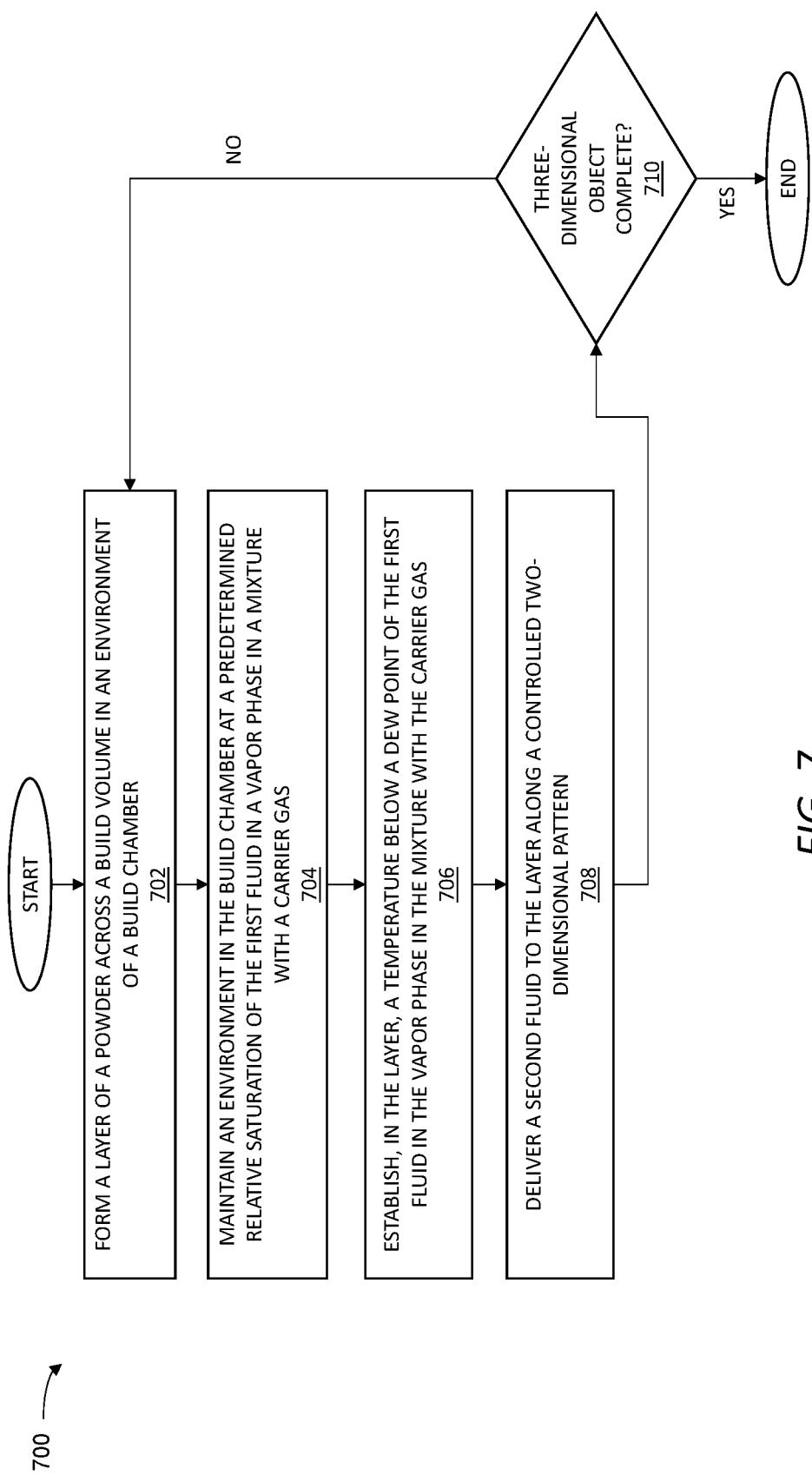
FIG. 7 is a flowchart of an exemplary method for managing powder mobility in binder jet additive manufacturing based on controlling an environment of a build chamber.

FIG. 7 is a flowchart of an exemplary method 700 for managing powder mobility in binder jet additive manufacturing based on controlling an environment of a build chamber. That is, by controlling the environment of the build chamber relative to a temperature of the layer, a vapor phase of the first fluid may condense along the layer as a suitably low temperature is established in the layer. Unless otherwise specified or made clear from the context, the exemplary method 700 may be implemented using any one or more of the various different additive manufacturing systems, and components thereof, described herein. Thus, for example, the exemplary method 700 may be implemented as computer-readable instructions stored on the computer readable storage medium 132 (FIGS. 1A-1C) and executable by the one or more processors 131 (FIGS. 1A-1C) of the controller 130 (FIGS. 1A-1C) to operate the additive manufacturing system 100 (FIGS. 1A-1C).

As shown in step 702, the exemplary method 700 may include forming a layer of the powder across a build volume at least partially defined by a print box, the layer of the powder exposed to an environment defined by a build chamber. In general, forming the layer of the powder in step 702 shall be understood to be analogous to step 302 described above with respect to the exemplary method 300 (FIG. 3). Thus, for example, forming the layer in step 702 shall be understood to include spreading any one or more of the various different types of powders described herein to form a substantially uniform layer of the powder across the top of the build volume.

In general, it may be useful to manage formation of the layer of the powder to reduce the likelihood that the first fluid in the environment above the layer may condense as the layer is being formed. Such premature condensation of the first fluid may, for example, interfere with uniformity of the layer and, over the course of a plurality of layers, may significantly distort the three-dimensional object being formed. Thus, in some instances, forming the layer may include spreading the powder at a temperature above the dew point of the first fluid in the vapor phase in the mixture with the carrier gas such that the first fluid does not prematurely condense as the powder is being spread to form the layer. For example, heat (e.g., from infrared heat source) may be directed at the powder as the spreader moves the powder across the layer. Additionally, or alternatively, the powder supply may be heated to a temperature above the dew point of the first fluid in the carrier gas in the build chamber. In certain implementations, forming the layer may further or instead include forming a non-condensing region locally in front of the spreader as the spreader moves across the build volume to form the layer. Such a non-condensing region may be formed, for example, through one or more of drying or introduction of a gas (e.g., blowing) that does not contain the first fluid in a concentration sufficient to condense.

As shown in step 704, the exemplary method 700 may include maintaining the environment in the build chamber at a predetermined relative saturation of a first fluid in a vapor phase in a mixture with a carrier gas. For example, the predetermined relative saturation of the first fluid in the vapor phase of the mixture with the carrier gas may be greater than about 10 percent and less than about 90 percent. Further, or instead, given that the first fluid introduced into the layer is drawn from the environment in the build chamber, maintaining the predetermined relative saturation of the first fluid in the vapor phase in the mixture with the carrier gas in the build chamber may include introducing the first fluid in the vapor phase into the build chamber at a volumetric flow rate greater than or substantially equal to a volumetric rate of condensation of the first fluid from the vapor phase to the liquid phase along the layer of the powder. Additionally, or alternatively, maintaining the predetermined relative saturation of the first fluid in the vapor phase in the mixture with the carrier gas may include continuously moving the mixture through the build chamber such that the environmental parameters in the build chamber may remain substantially constant even as the first fluid condenses onto the layer.

In certain implementations, a volume of the first fluid in the vapor phase in the environment in the build chamber may be greater than the volume of void space defined by the powder in the layer such that penetration of the first fluid into the void space is generally not limited by the amount of the first fluid available in the environment.

As shown in step 706, the exemplary method 700 may include establishing, in the layer, a temperature below a dew point of the first fluid in the vapor phase in the mixture with the carrier gas such that at least some of the vapor phase of the first fluid in contact with the powder in the layer condenses to a liquid phase along the layer of the powder. That is, returning to the example in which the powder is heated as it is spread to form the layer, the layer of the powder may be cooled from a temperature above the dew point to a temperature below the dew point such that the first fluid in contact with the first layer may condense. Although some degree of cooling may occur through natural convection between the layer of the powder and the environment in the build chamber, forced convective cooling (e.g., by blowing a cooled gas, such as the carrier gas, over the layer) may be useful for cooling the layer to a predetermined temperature below the dew point to facilitate achieving repeatability of the condensation process on a layer-to-layer basis. Further, or instead, forced convective cooling may be useful for achieving cooling on a time scale that may be suitably implemented in a layer-by-layer process.

As shown in step 708, the exemplary method 700 may include delivering a second fluid to the layer along a respective controlled two-dimensional pattern associated with the layer according to a computerized model of a three-dimensional object. The second fluid may be any one or more of the second fluids described herein and, thus, may be a binder or a component of a binder system. In certain implementations, condensation of the first fluid from the vapor phase to the liquid phase in the layer may precede delivering the second fluid to the layer along the controlled two-dimensional pattern to reduce the likelihood of mechanical ejection of particles of the powder upon impact by the second fluid along the controlled two-dimensional pattern.

In certain instances, it may be useful to control the temperature of the second fluid in coordination with the temperature of the layer and the dew point temperature. For example, to avoid creating an inadvertent temperature differential that drives further condensation of the first fluid from the environment of the build chamber, the second fluid may be delivered to the layer at a temperature substantially equal to or greater than the temperature of the layer such that the second fluid does not cool the layer.

As shown in step 710, the exemplary method 700 may include repeating steps 702, 704, 706, and 708 for a plurality of layers such that at least the second fluid (and, in some cases, at least a portion of the first fluid) operates to bind at least a portion of the particles of the layer of the powder to define a three-dimensional object in a build volume. In some implementations, each of the steps may be performed in each of the plurality of layers forming the three-dimensional object. In some implementations, however, certain steps may be performed selectively in the plurality of layers forming the three-dimensional object. For example, in some cases, the temperature of a given layer may be maintained above the dew point of the first fluid such that condensation does not occur in the given layer.

While phase change of the first fluid has been described in terms of condensation from a vapor phase to a liquid phase, it should be appreciated that other phase changes may be useful in reducing mobility of particles in a binder jetting process.

As an example, referring again FIG. 3, condensing the first fluid in the exemplary method 300 may further include freezing the first fluid along the layer of the powder to form a solid phase along the respective layer. As compared to the reduction in mobility imparted to the particles by the liquid phase of the first fluid, the solid phase may offer further reduction in mobility. In general, freezing the first fluid along the layer of the powder may include exposing the layer of the powder to a material below the freezing point of the first fluid. Examples of cold materials that may be useful for freezing the first fluid along the layer include one or more of refrigerated air or liquid nitrogen. Given that the persistence of the solid phase beyond formation of a given layer may be undesirable, the second fluid delivered to the layer in the controlled two-dimensional pattern may be at a temperature sufficient to melt the solid phase to the liquid phase along at least the controlled two-dimensional pattern. The second fluid may further or instead cause melting of the solid phase through chemical reaction.

As yet another example of the use of other types of phase changes, FIG. 8 is a flowchart of an exemplary method for managing powder mobility in binder jet additive manufacturing using vapor deposition.

As shown in step 802, the exemplary method 800 may include spreading a layer of a powder across a build volume at least partially defined by a print box. In general, spreading the layer in step 802 shall be understood to be analogous to step 302 described above with respect to the exemplary method 300 (FIG. 3). Thus, for example, spreading the layer in step 802 shall be understood to include spreading any one or more of the various different types of powders described herein to form a substantially uniform layer of the powder across the top of the build volume.

As shown in step 804, the exemplary method 800 may include directing a first material in a vapor phase to the layer, the first material undergoing deposition from the vapor phase to form a solid along the layer (e.g., along an entire x-y extent of the layer). As used in this context, deposition should be understood to refer to a phase transition in which the vapor phase of the first material transforms into a solid phase without passing through a liquid phase. As compared to depositing a liquid phase and freezing the liquid phase, deposition of the first material may be useful, for example, for achieving substantial reduction in mobility of the powder relatively quickly (e.g., without the additional delay associated with freezing a liquid phase).

In general, directing the first material in the vapor phase to the layer may include moving the first material in the vapor phase (e.g., with or without mixing in one or more of a carrier gas or a distribution gas) to the layer of the powder. In instances in which a carrier gas or a distribution gas is used to deliver the first material, the first material may be substantially inert with respect to the carrier gas or the distribution gas, as the case may be. Further, or instead, the first material may be substantially inert with respect to the one or more of the carrier gas or the distribution gas, as a given implementation may dictate.

In certain implementations, the first material may be a material that is in the solid form at or near room temperature conditions (e.g., naphthalene or iodine). In such instances, the solid phase of the first material may be realized along the layer without additional cooling. As should be readily appreciated, this may offer certain advantages with respect to complexity of implementation.

As shown in step 806, the exemplary method 800 may include delivering a second material to the layer along a controlled two-dimensional pattern associated with the layer. In general, delivering the second material to the layer in step 806 shall be understood to be analogous to step 308 described above with respect to the exemplary method 300 (FIG. 3). Thus, for example, delivering the second material to the layer in step 806 may include jetting or otherwise delivering the second material from a printhead moving over the layer.

In certain implementations, deposition of the first material from the vapor phase to the solid along the layer may precede delivery of the second material to the layer. That is, with the solid along the layer, the impact of the second material incident on the layer may be less likely to eject particles of the powder.

It may be generally desirable to maintain the second material in a liquid phase in the layer to facilitate, for example, penetration of the second material in the layer. Thus, in some instances, it may be useful to control the temperature of the layer to a temperature between a first temperature associated with freezing of the first material and a second temperature associated with freezing of the second material. More specifically, the second temperature may be lower than the first temperature such that the second material may be delivered in a liquid phase in a layer that includes the solid formed from the first material. As a more specific example, the first material may include water, and the second material may include alcohol. Continuing with this example, the layer may be cooled to a temperature of about −5° C. (e.g., using refrigerated air in an environment above the layer). As the first material including water contacts the layer, the deposition of the water may form frost on the layer. This frost may reduce mobility of the particles in the layer as the second material including alcohol is delivered in a liquid phase to the layer and penetrates the layer.

As shown in step 808, the exemplary method 800 may include repeating one or more of the steps 802, 804, and 806 for a plurality of layers such that at least the second material (and, in some cases, at least a portion of the solid formed from the first material) operates to bind at least some of the powder in the plurality of layers to form a three-dimensional object in the build volume defined by the print box. In certain implementations, each of the steps may be performed in each layer to form the three-dimensional object. In some implementations, however, certain steps may be performed selectively in the plurality of layers forming the three-dimensional object. As an example, the step of directing the vapor phase of the first material may be skipped for certain layers in the plurality of layers.

As shown in step 810, the exemplary method 800 may further or instead include heating the three-dimensional object to an elevated temperature. As the three-dimensional object is heated to this elevated temperature, the solid formed from the first material may sublimate from the three-dimensional object. For example, as the first material sublimates from the three-dimensional object, the second material may remain in the three-dimensional object. Further, or instead, in instances in which the second material includes at least one component of a binder system, heating the three-dimensional object to the elevated temperature may increase one or more of a degree of polymerization or a degree of crosslinking of the at least one component of the binder system such that the three-dimensional object may become more dimensionally stable.

The above systems, devices, methods, processes, and the like may be realized in hardware, software, or any combination of these suitable for a particular application. The hardware may include a general-purpose computer and/or dedicated computing device. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. In another aspect, the methods may be embodied in systems that perform the steps thereof, and may be distributed across devices in a number of ways. At the same time, processing may be distributed across devices such as the various systems described above, or all of the functionality may be integrated into a dedicated, standalone device or other hardware. In another aspect, means for performing the steps associated with the processes described above may include any of the hardware and/or software described above. All such permutations and combinations are intended to fall within the scope of the present disclosure.

Embodiments disclosed herein may include computer program products comprising computer-executable code or computer-usable code that, when executing on one or more computing devices, performs any and/or all of the steps thereof. The code may be stored in a non-transitory fashion in a computer memory, which may be a memory from which the program executes (such as random access memory associated with a processor), or a storage device such as a disk drive, flash memory or any other optical, electromagnetic, magnetic, infrared or other device or combination of devices. In another aspect, any of the systems and methods described above may be embodied in any suitable transmission or propagation medium carrying computer-executable code and/or any inputs or outputs from same.

The method steps of the implementations described herein are intended to include any suitable method of causing such method steps to be performed, consistent with the patentability of the following claims, unless a different meaning is expressly provided or otherwise clear from the context. So, for example performing the step of X includes any suitable method for causing another party such as a remote user, a remote processing resource (e.g., a server or cloud computer) or a machine to perform the step of X. Similarly, performing steps X, Y and Z may include any method of directing or controlling any combination of such other individuals or resources to perform steps X, Y and Z to obtain the benefit of such steps. Thus, method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It should further be appreciated that the methods above are provided by way of example. Absent an explicit indication to the contrary, the disclosed steps may be modified, supplemented, omitted, and/or re-ordered without departing from the scope of this disclosure.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the spirit and scope of this disclosure and are intended to form a part of the invention as defined by the following claims, which are to be interpreted in the broadest sense allowable by law.

The invention claimed is:

1. A method of forming an object using binder jet additive manufacturing, the method comprising:
   forming a plurality of build layers, wherein each build layer is formed by:
      traversing a rotating roller to form a layer of powder within a build chamber,
      traversing an evaporator in advance of a printhead to generate a first fluid in a vapor phase and direct the first fluid toward the layer of powder,
      condensing the first fluid from the vapor phase to the liquid phase on at least a portion of the layer of powder to reduce the mobility of the particles of the powder,
      traversing the print head to deposit a binder in a predetermined pattern in the layer of the powder.

2. The method of claim 1, further comprising controlling a temperature of at least a portion of the layer of powder to below a dew point of the first fluid in the vapor phase.

3. The method of claim 1, wherein the evaporator further includes an atomizer disposed along a inlet section and in fluid communication with an outlet section via the flow path.

4. The method of claim 3, wherein the atomizer is one or more of an ultrasonic atomizer, a hydraulic atomizer, or a gas atomizer.

5. The method of claim 3, wherein the atomizer further includes a gate selectively movable relative to the flow path to control fluid flow through the outlet section.

6. The method of claim 1, wherein the evaporator further comprises a humidity probe positioned to measure humidity of a fluid issuing from the outlet section of the evaporator.

* * * * *